US006947601B2

(12) United States Patent
Aoki et al.

(10) Patent No.: US 6,947,601 B2
(45) Date of Patent: Sep. 20, 2005

(54) DATA TRANSMISSION METHOD, APPARATUS USING SAME, AND DATA TRANSMISSION SYSTEM

(75) Inventors: Keisuke Aoki, Tokyo (JP); Hirofumi Morimoto, Kanagawa (JP); Masatoshi Takashima, Tokyo (JP); Hideyuki Narita, Kanagawa (JP); Daisuke Hiranaka, Kanagawa (JP); Yoshihiro Ishida, Chiba (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 09/862,834

(22) Filed: May 22, 2001

(65) Prior Publication Data

US 2002/0054032 A1 May 9, 2002

(30) Foreign Application Priority Data

May 24, 2000 (JP) ........................................ 2000-157994

(51) Int. Cl.[7] ................................................ G06K 9/36
(52) U.S. Cl. ........................ 382/235; 382/209; 382/236; 382/238
(58) Field of Search ................................ 382/235, 236, 382/209, 232, 238; 600/443; 73/607; 375/240.03; 348/22, 169, 143, 151, 172; 356/437, 139.08; 396/324

(56) References Cited

U.S. PATENT DOCUMENTS

| | | | | |
|---|---|---|---|---|
| 3,954,340 A | * | 5/1976 | Blomqvist et al. | 356/139.08 |
| 4,562,466 A | * | 12/1985 | Clapp et al. | 375/240.12 |
| 4,597,010 A | * | 6/1986 | Carr | 375/240.12 |
| 5,313,296 A | * | 5/1994 | Ohki | 348/208.1 |
| 5,323,987 A | * | 6/1994 | Pinson | 244/3.16 |
| 5,420,692 A | * | 5/1995 | Lin et al. | 382/245 |
| 5,460,178 A | * | 10/1995 | Hudon et al. | 600/443 |
| 5,521,634 A | * | 5/1996 | McGary | 348/169 |
| 5,631,697 A | * | 5/1997 | Nishimura et al. | 348/172 |
| 5,828,913 A | * | 10/1998 | Zanen | 396/324 |
| 5,832,125 A | * | 11/1998 | Reese et al. | 382/239 |
| 5,883,662 A | * | 3/1999 | Zanen | 348/49 |
| 6,141,060 A | * | 10/2000 | Honey et al. | 348/578 |
| 6,297,846 B1 | | 10/2001 | Edanami | 348/239 |
| 6,529,482 B1 | * | 3/2003 | Lundby | 370/252 |
| 6,633,609 B1 | * | 10/2003 | Ing et al. | 375/240.03 |
| 6,687,407 B2 | * | 2/2004 | Peters | 382/232 |
| 6,853,453 B2 | * | 2/2005 | Kwon | 356/437 |

FOREIGN PATENT DOCUMENTS

| | | | | |
|---|---|---|---|---|
| EP | 0766460 A2 | * | 4/1997 | .......... H04N/5/235 |
| JP | 07110429 | | 4/1995 | ............ G02B/7/28 |
| JP | 08125908 | | 5/1996 | .......... H04N/5/232 |
| JP | 10 51755 | | 2/1998 | ............ H04N/7/15 |

OTHER PUBLICATIONS

Donohoe et al., "Change Detection for Target Detection and Classification in Video Sequences", IEEE International Conferenc on Acoustics, Speech, and Signal Processing, Apr. 1988, vol. 2, pp. 1084–1087.*

Vetro et al., "Joint Shape and Texture Rate Control for MPEG–4 Encoders", IEEE International Symposium on Circuits and Systems, vol. 5, May 1998, pp. 285–288.*

\* cited by examiner

*Primary Examiner*—Anh Hong Do
(74) *Attorney, Agent, or Firm*—Frommer Lawrence & Haug LLP; William S. Frommer

(57) ABSTRACT

A data transmission method able to maintain the quality of a transmitted image substantially same as that of one's own image and an apparatus using the method and a data transmission system, transmitting image data accommodated in a frame of a preset frame during communication between terminals, comprising capturing an image including a target image to be transmitted, making adjustments so that the target image to be transmitted from the obtained image substantially fully fills the image frame, and compressing and transmitting the adjusted image data in the image frame.

48 Claims, 20 Drawing Sheets

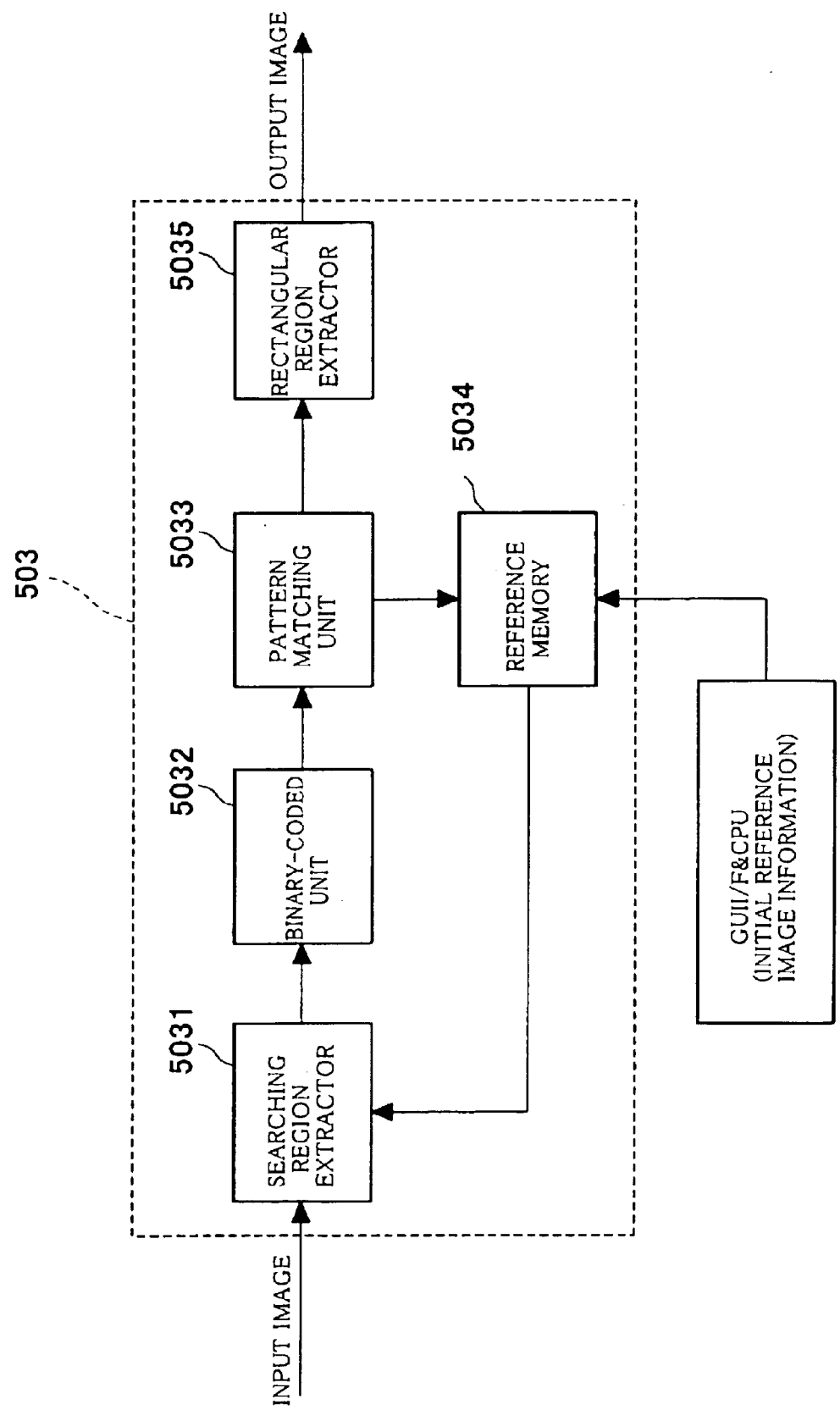

MONITORING OF TRANSMITTED IMAGE SIZE FRAME

MONITORING OF REDUCED IMAGE

EXAMPLE OF FACE SIZE CALCULATION

EXAMPLE OF FACE PART DETECTION SEARCHING REGION

FACE PART SEARCHING REGION

PIXELS IN SPECIFIED INITIAL REGION e

PIXELS OF SKIN COLORS
IN SPECIFIED INITIAL REGION f

FACE PART SEARCHING REGION

DATA TRANSMISSION METHOD, APPARATUS USING SAME, AND DATA TRANSMISSION SYSTEM

BACKGROUND OF THE INVENTION

1. Field of the Invention

The present invention relates to a method for transmitting data including images during communication and streaming among a plurality of terminals, a data transmission apparatus such as a mobile phone, a PDA, a TV telephone terminal, and a PC terminal, and a data transmission system.

2. Description of the Related Art

As a communication service for communications and streaming among a plurality of terminals, there is for example, as illustrated in FIG. 1, the visual communication service for transmission of data and images by mobile terminals (MT) comprised of portable phones.

The visual communication service system 1 compresses voice and images and exchanges signals between a mobile terminal (hereinafter simply referred to as a "terminal") 2-1 and terminal 2-2 through a transmission channel 3 to enable conversation to be enjoyed while viewing the other party's face.

Each of the terminals 2-1 and 2-2, whose appearances are illustrated in FIG. 1, has a body case 21, an operation panel 22 provided at the lower portion of the body case 21 and including a keypad for inputting a telephone number for a call function or for inputting certain operational instructions, a display monitor 23 provided above the operational panel 22, a camera 24 provided above the display monitor 23 (at the upper portion of the body case 21), and an antenna 25.

The transmission channel 3 includes mobile base stations (MBS) 31-1 and 31-2, mobile switching centers (MSC) 32-1 and 32-2, gateway mobile switching centers (GMSC) 33-1 and 33-2 having home location registers (HLR), and a circuit network 35.

The mobile base stations 31-1 and 31-2 communicate with the terminals 2-1 and 2-2. The signals handled by the base stations 31-1 and 31-2 are sent to the higher level mobile switching centers 32-1 and 32-2 and further to a backbone circuit network 35 through the higher level gateway mobile switching centers 33-1 and 33-2.

When transmitting images to such a circuit network 35, however, the information carrying capacity of the circuit network 35 is limited by the bandwidth of the circuit network 35.

Therefore, a user who is talking using for example the terminal 2-1 can view his or her own image captured by the camera 24 at a high quality such as with the image shown by 23a in FIG. 1 because the image is monitored directly, but after compression at the terminal 2-1 and transmission to the terminal 2-2, the quality of the image sent from the terminal 2-1 becomes extremely degraded at the terminal 2-2 such as shown by the image shown by 23b.

Similarly, at the terminal 2-1, the quality of the image sent from the terminal 2-2 to the terminal 2-1 becomes extremely degraded.

In this way, in an image transmission system of the prior art, the transmitted images become extremely degraded. The difference from the image which the user himself or herself monitors becomes too great. This causes not only a strong uncomfortable feeling but also a feeling of stress as the expression of the other party cannot be seen clearly.

Further, in each of the terminals 2-1 or 2-2, the camera 24 is located above the display monitor 23 of the terminal. The users look at their display monitors 23 of their terminals. Therefore there is the problem that both end up looking down and therefore conversation maintaining eye contact becomes impossible.

SUMMARY OF THE INVENTION

An object of the present invention is to provide a data transmission method able to maintain the quality of a transmitted image substantially the same as that of one's own image and an apparatus using the method and a data transmission system.

A second object of the present invention is to provide a data transmission method able to realize communication in a state where eye contact is maintained and an apparatus using the method and a data transmission system.

In order to achieve the above objects, the present invention provides a data transmission method for transmitting at least image data accommodated in an image frame of a preset size, comprising the steps of capturing an image including a target image to be transmitted; making adjustments so that the target image to be transmitted from the captured image substantially fully fills the image frame; and compressing and transmitting the adjusted image data in the image frame.

Further, the present invention provides a data transmission method for transmitting at least image data comprising the steps of capturing an image including a target image to be transmitted; making adjustments so that the target image to be transmitted from the captured image has a preset size; and compressing and transmitting the adjusted image data in the image frame.

The method of the present invention further comprises, when making adjustments so that a target image fully fills an image frame or when making adjustments so that the target image to be transmitted from the captured image has a preset size, using an image of a characteristic portion of the image to be transmitted for matching and cutting out the image around the part with the best match for tracking of the image.

Alternatively, the method of the present invention further comprises, when making adjustments so that a target image fully fills an image frame or when making adjustments so that the target image to be transmitted from the captured image has a preset size, using an image of a characteristic portion of the image to be transmitted to calculate a distance in the characteristic portion and using this for enlargement, reduction, and tracking of the image.

Alternatively, the method of the present invention further comprises, when detecting a characteristic portion of an image, locking an image in a desired image state while monitoring a state of input of the image to be transmitted and using a center portion of the locked image as the characteristic portion of the image.

Alternatively, the method of the present invention further comprises, when detecting a characteristic portion of an image, displaying a state of input of the image to be transmitted, specifying a certain location on the display screen, and using the portion around the specified point as the characteristic portion of the image.

Alternatively, the method of the present invention further comprises, when locking a target image by using a characteristic portion of an image, fetching and tracking the image at a frame rate the same as or higher than the image to be transmitted and refreshing a reference image serving as a reference for tracking at a rate the same as or higher than the transmission frame rate.

Alternatively, the method of the present invention further comprises displaying a state of input of a transmitted image and specifying a range to be transmitted on the display to determine the range of transmission of the image.

Further, the present invention provides a data transmission method for displaying at least image data of a user on a display screen among a plurality of terminals and transmitting at least image data while displaying received image data on the display screen, comprising capturing an image including a target image of a user to be transmitted from substantially the center of the display screen.

Further, the present invention provides a data transmission method for displaying at least image data of user on a display screen among a plurality of terminals and transmitting at least image data while displaying received image data of another party on the display screen and displaying content for common discussion on the display screen, comprising the steps of capturing an image including a target image of a user to be transmitted from substantially a center of the display screen and displaying the image data at one of an upper portion or a lower portion of the display screen from the substantially center portion of the display screen serving as the capturing portion and displaying the content at the other portion.

That is, the method of the present invention comprises displaying image data above the content on the display screen or displaying image data below the content on the display screen.

Further, the present invention provides a data transmission apparatus for transmitting at least image data accommodated in an image frame of a preset size, comprising an imaging means for capturing an image including a target image to be transmitted; a first circuit for making adjustments so that the target image to be transmitted from the captured image by the imaging means substantially fully fills the image frame; and a second circuit for compressing and transmitting the adjusted image data in the image frame.

Further, the present invention provides a data transmission apparatus for transmitting at least image data, comprising an imaging means for capturing an image including a target image to be transmitted; a first circuit for making adjustments so that the target image to be transmitted from the captured image has a preset size; and a second circuit for compressing and transmitting the adjusted image data in the image frame.

In the data transmission apparatus of the present invention, when making adjustments so that a target image fully fills an image frame or when making adjustments so that the target image to be transmitted has a preset size, the first circuit uses an image of a characteristic portion of the image to be transmitted for matching and cuts out the image around the part with the best match for tracking of the image.

Alternatively, in the data transmission apparatus of the present invention, when making adjustments so that a target image fully fills an image frame or when making adjustments so that the target image to be transmitted has a preset size, the first circuit uses an image of a characteristic portion of the image to be transmitted to calculate a distance in the characteristic portion and uses this for enlargement, reduction, and tracking of the image.

Alternatively, the data transmission apparatus of the present invention comprises a displaying means for displaying image data and a locking means able to lock an image displayed by the displaying means in a desired state, wherein when detecting a characteristic portion of an image, the first circuit uses a center portion of the image locked by the locking image as the characteristic portion of the image.

Alternatively, the data transmission apparatus of the present invention comprises a displaying means for displaying image data and including a pointer able to specify a certain location and a specifying means able to specify a certain location of the image displayed on the displaying means by the pointer, wherein when detecting a characteristic portion of an image, the first circuit uses a portion around the point specified by the specifying means as the characteristic portion of the image.

Alternatively, in the data transmission apparatus of the present invention, when locking a target image by using a characteristic portion of the image, the first circuit fetches the image and performs a tracking operation at a frame rate the same as or higher than the image to be transmitted and refreshes a reference image serving as a reference for tracking at a rate the same as or higher than the transmission frame rate.

Alternatively, the data transmission apparatus of the present invention comprises a displaying means for displaying image data and including a pointer able to specify a certain location and a specifying means able to specify a certain location of the image displayed by the displaying means by the pointer, wherein the first circuit decides on the range specified by the specifying means as the range for transmission of the image.

Further, the present invention provides a data transmission system for displaying at least image data of a user on a display screen among a plurality of terminals and transmitting at least image data while displaying received image data of another party on the display screen, wherein a terminal comprises an imaging means for capturing an image including a target image to be transmitted; a first circuit for making adjustments so that the target image to be transmitted from the captured image by the imaging means substantially fully fills an image frame; and a second circuit for compressing and transmitting the adjusted image data in the image frame.

Further, the present invention provides a data transmission system for displaying at least image data of a user on a display screen among a plurality of terminals and transmitting at least image data while displaying received image data of another party on the display screen, wherein a terminal comprises an imaging means for capturing an image including a target image to be transmitted; a first circuit for making adjustments so that the target image to be transmitted from the captured image becomes a preset size; and a second circuit for compressing and transmitting the adjusted image data in an image frame.

Further, the present invention provides a data transmission system for displaying at least image data of a user on a display screen among a plurality of terminals and for transmitting at least image data while displaying received image data on the display screen, wherein an imaging means for capturing an image including a target image to be transmitted is provided substantially at the center of the display screen.

Further, the present invention provides a data transmission system for displaying at least image data of a user on a display screen among a plurality of terminals and for transmitting at least image data while displaying received image data of another party on the display screen and displaying content for common discussion on the display screen comprising an imaging means provided substantially at the center of the display screen and capturing an image including a target image to be transmitted and a displaying means for displaying the image data at one of an upper portion or a lower portion of the display screen from the substantially center portion of the display screen serving as the capturing portion and displaying the content at the other portion.

According to the present invention, in order for a target image such as an image of a user's face to fully fill an image frame, the face image is enlarged, reduced, or tracked according to its movement. Then, only the face image is cut out and that image is compressed and transmitted.

Further, according to the present invention, in order for the size of a user's transmitted image to be kept constantly the same, the image is enlarged, reduced, or tracked according to its movement. Due to this, an image of a person of the same size is cut out and that image is compressed and transmitted.

Further, by configuring the invention so that a user is able to lock (keep) an image in a desired state while viewing the monitor screen, the image can be tracked, enlarged, reduced, or cut out on the terminal according to the instructions of the user.

Further, in order to continue the locked state, at the time of starting locking, for example, a characteristic portion (a portion of the body such as the eyes, nose, mouth, ears, or outline of the face) is cut out from the image. Using this portion as a reference, the image is enlarged, reduced, or tracked.

For example, the distance between the two eyes is detected, and from this distance, the rate of enlargement or reduction or the position of cut out is detected.

In addition, the entire image input from the imaging means, that is, the camera, is output for the image on the monitor of the user. The user specifies a region of the image to cut out that region. That image is then reduced, enlarged, or tracked so that this image subsequently remains the same size.

Further, by using an operable pointer on a monitor screen, a user specifies a characteristic image at the time of starting locking and therefore that image is reduced, enlarged, or tracked.

Further, in order to increase the tracking accuracy, the image is fetched and tracked at a frame rate the same as or higher than the image to be transmitted, and a reference image serving as a reference for tracking is refreshed at a rate the same as or higher than the transmission frame rate.

Further, an imaging means is embedded in the display screen. Therefore, the lines of sight of the mutually transmitted images can be matched.

In addition, according to the present invention, for example, a face image and content for discussion are provided above and below each other and an imaging means is provided near the place between them, so images of users talking while viewing the image under discussion can be transmitted to each other. Further, virtual reality communication where eye contact can be maintained when viewing each others' faces on the monitor can be realized.

BRIEF DESCRIPTION OF THE DRAWINGS

These and other objects and features of the present invention will become clearer from the following description of the preferred embodiments given with reference to the attached drawings, in which:

FIG. 5 is a circuit diagram of a pre-processing circuit in FIG. 4 according to the first embodiment.

DESCRIPTION OF THE PREFERRED EMBODIMENTS

Below, preferred embodiments of the present invention will be explained with reference to FIG. 1 to 24.

Figure 1:
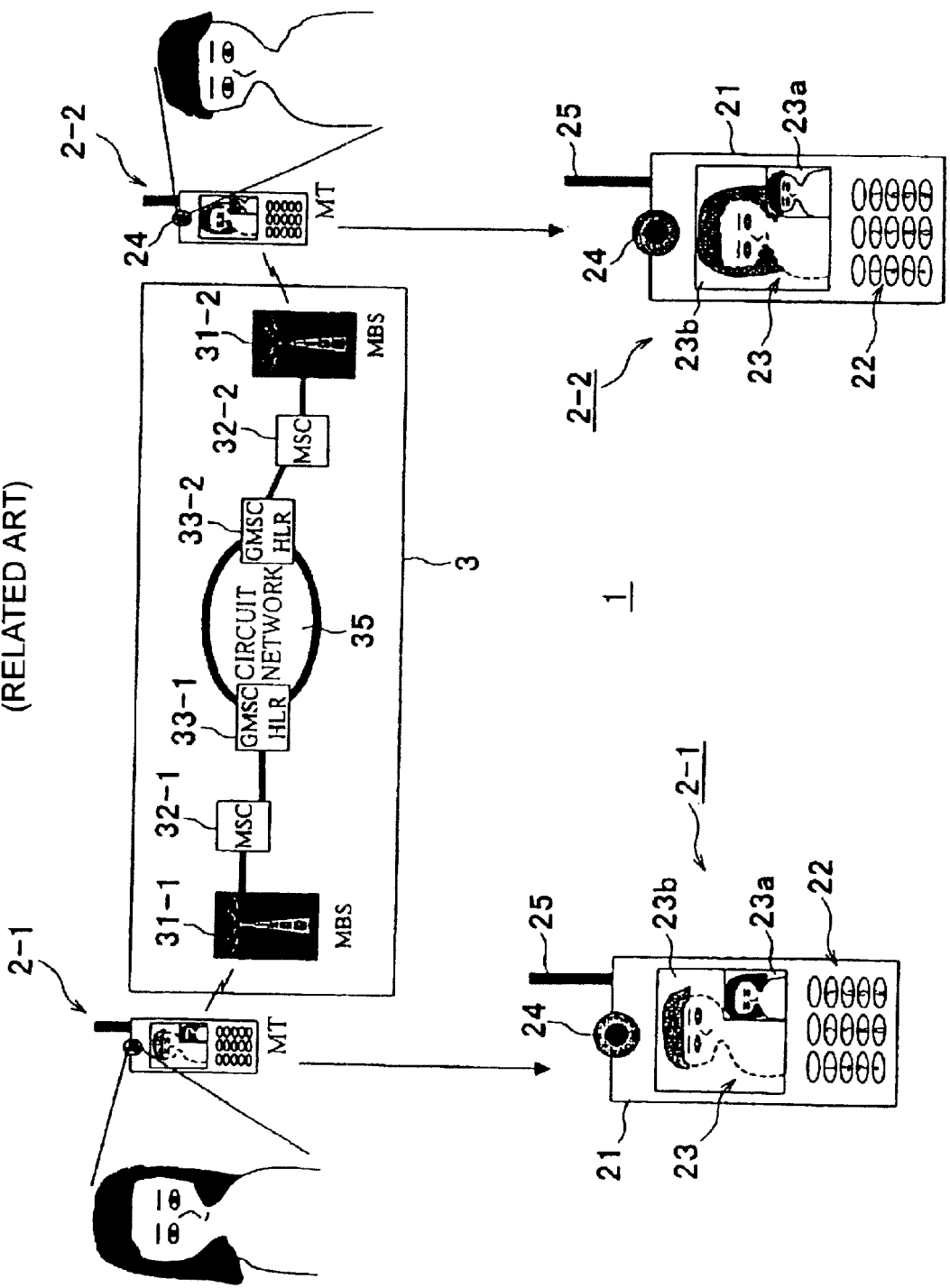
FIG. 1 is a view of terminals and a transmission channel in visual communication of the related art.
Figure 2:
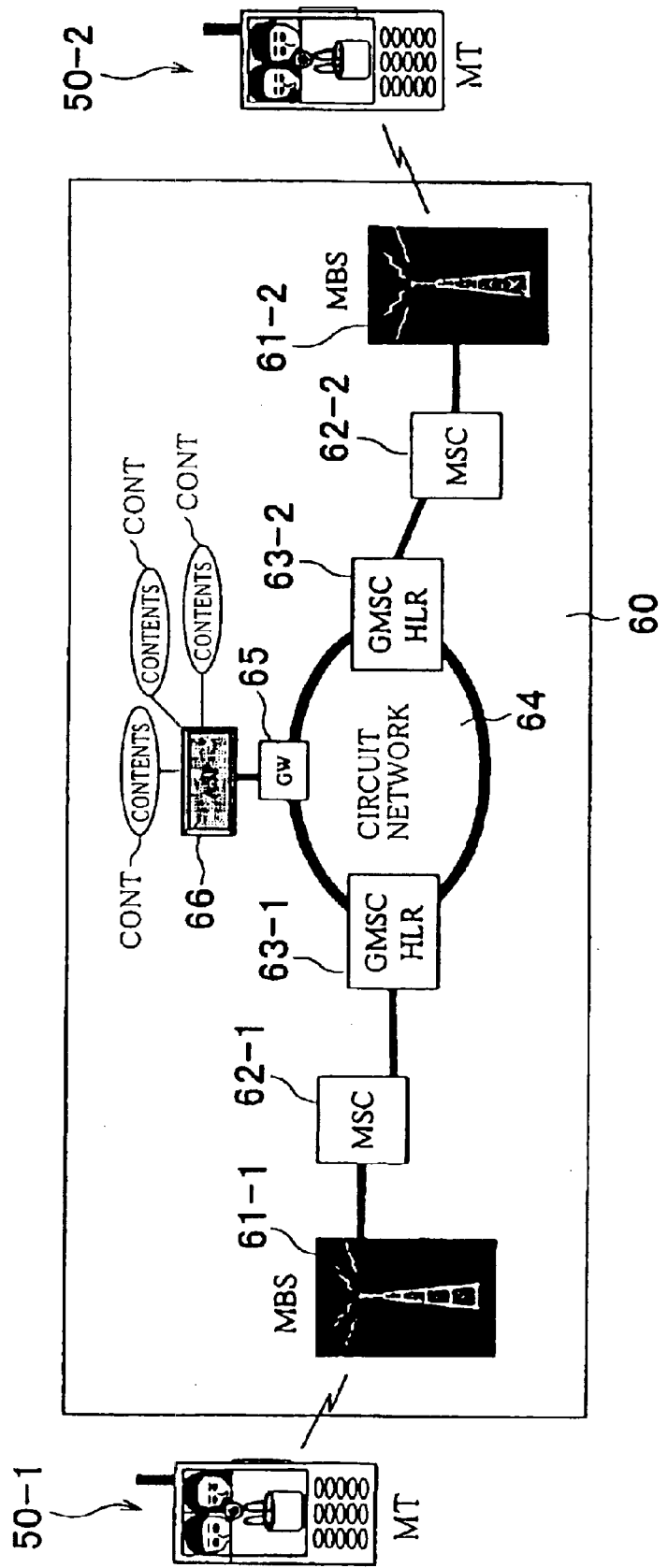
FIG. 2 is a view of the system configuration of an embodiment of a visual communication service system as a data transmission system according to the present invention.

FIG. 2 is a view of the configuration of an embodiment of a visual communication service system as a data transmission system according to the present invention.

The visual communication service system 100 compresses voice and image data and exchanges signals among a plurality of terminals, for example, between a mobile terminal (hereinafter simply referred to as a "terminal") 50-1 and terminal 50-2 through a transmission channel 60. By this system, a user is able to enjoy conversation with another party while viewing his or her face.

Figure 3:
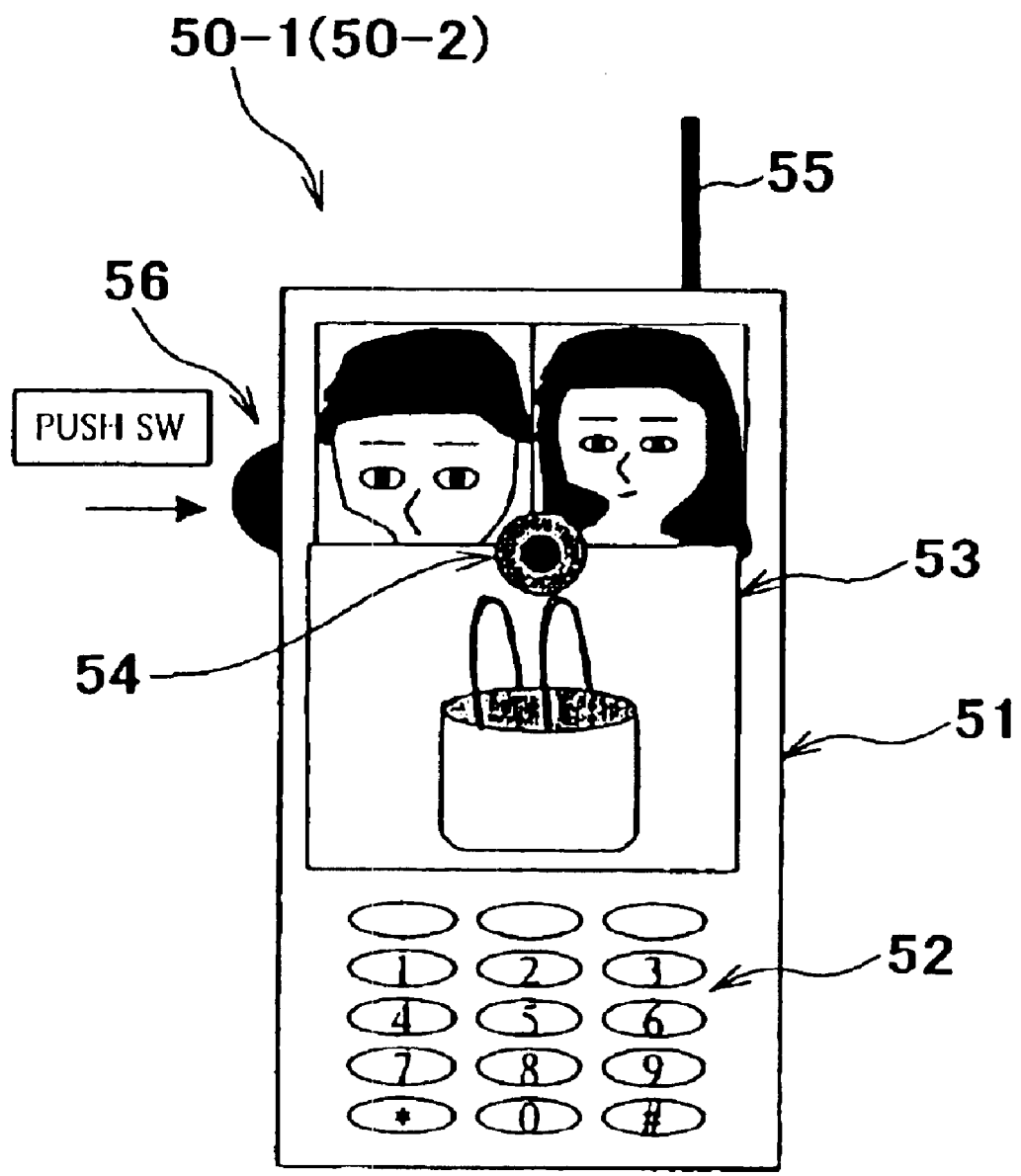
FIG. 3 is a view of the appearance showing one example of the configuration of a mobile terminal according to the present embodiment.

FIG. 3 is a view of the appearance showing an example of the configuration of the terminal 50-1 or 50-2.

The terminal 50-1 or 50-2, whose appearance is illustrated in FIG. 3, has a body case 51, an operation panel 52 provided at the lower portion of the body case 51 and including a keypad for inputting a telephone number for a call function or for inputting specific operational instructions, a display monitor 53 provided above the operational panel 52, a camera module 54 including a lens arranged at substantially a center region of the display monitor 53 and serving as an imaging means, an antenna 55, and a switch 56 acting as a locking means or specifying means and provided with functions as a GUI.

In FIG. 3, a microphone and a speaker are omitted. The specific circuit configuration of a terminal acting as a data transmission apparatus will be described in detail later.

In this way, the display monitor 53 has a lens portion of the camera module 54 arranged at the substantially center region. As shown in FIG. 3, face images and a predetermined content image obtained from a later explained application service provider (ASP) are displayed above and below the position of the lens portion.

In the example in FIG. 3, the face images are shown at the upper portion, and the contents image is shown at the lower portion, but it is also possible to conversely display the content images at the upper portion and the face images at the lower portion.

The transmission channel 60 includes mobile base stations (MBS) 61-1 and 61-2, mobile switching centers (MSC) 62-1 and 62-2, gateway mobile switching centers (GMSC) 63-1 and 63-2 having home location registers (HLR), and a circuit network 64.

The mobile base stations 61-1 and 61-2 communicates with the terminals 50-1 and 50-2, respectively. The signals handled by the base stations 61-1 and 61-2 are transmitted to the higher level mobile switching center 62-1 and 62-2 and further to a backbone circuit network 64 through the higher level gateway mobile switching centers 63-1 and 63-2.

Further, a gateway (GW) 65 is connected to the circuit network 64, while a application service provider 66 able to distribute content is connected with the gateway 65.

Therefore, it is possible to start up the application service provider (ASP) 66 offering various content CONT and output the same images of the content CONT to the terminals 50-1 and 50-2 through the gateway 65.

Below, circuit configurations of specific signal processing systems in terminals 50 (terminals 50-1 and 50-2) acting as data transmission apparatuses according to the present invention, as applied to the above visual communication service system 100, will be explained as first, second, and third embodiments with reference to the accompanying drawings.

First Embodiment

Figure 4:
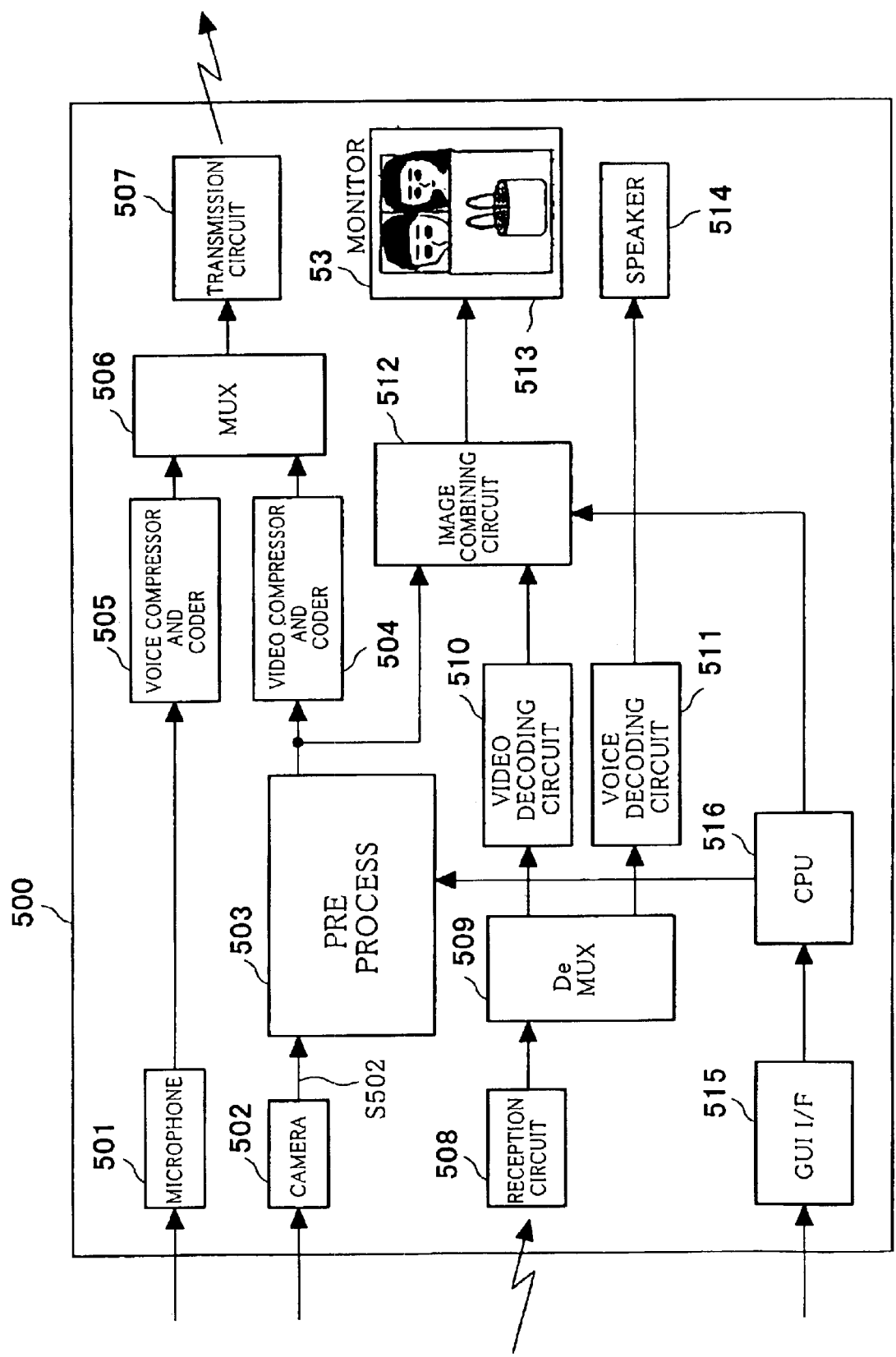
FIG. 4 is a circuit diagram of a first embodiment of a signal processing system of a terminal as a data transmission apparatus according to the present invention.

FIG. 4 is a circuit diagram of a first embodiment of a signal processing system of a terminal functioning as a data transmission apparatus according to the present invention.

The signal processing system 500, as shown in FIG. 4, has a microphone 501, a camera circuit 502, a pre-processing circuit 503 as the first circuit, a video compressor and coder 504, a voice compressor and coder 505, a multiplexer (MUX) 506, a transmission circuit 507, a reception circuit 508, a demultiplexer (DeMUX) 509, a video decoding circuit 510, a voice decoding circuit 511, an image combining apparatus 512, a display circuit 513, a speaker 514, a GUI interface (I/F) circuit 515, and a CPU 516.

The video compressor and coder 504, voice compressor and coder 505, multiplexer (MUX) 506, and transmission circuit 507 form the second circuit.

The microphone 501 converts the voice generated by a user into an electrical signal and outputs it to the voice compressor and coder 505.

The camera circuit 502 performs certain processing on an image of for example the upper part of a user's body captured by the camera module 54 through its lens and converted from an optical signal into an electrical signal and outputs the signal as a digital image signal S502 to the pre-processing circuit 503.

The pre-processing circuit 503 receives the digital image signal S502, extracts an image to be transmitted (hereinafter referred to as a "target image") from the image of the upper part of the user's body, generates an image signal adjusted so that the image to be transmitted fully fills the image frame, and outputs it to the video compressor and coder 504 and image combining circuit 512.

As the processing for adjusting the target image to fully fill the image frame, the pre-processing circuit 503 for example uses the image of a characteristic portion of the image to be transmitted for matching and cuts out the images around the part of the best match so as thereby to enable tracking of the image.

Here, "fully fill the image frame" means to thoroughly fill it with the target image until the background is not recognizable. Especially, in image transmission apparatuses for communication, the target images are mostly face images.

Below, the processing of the pre-processing circuit 503 will be described in further detail.

FIG. 5 is a circuit diagram of an example of the specific configuration of a principal portion of the pre-processing circuit according to the first embodiment.

Figure 6B:
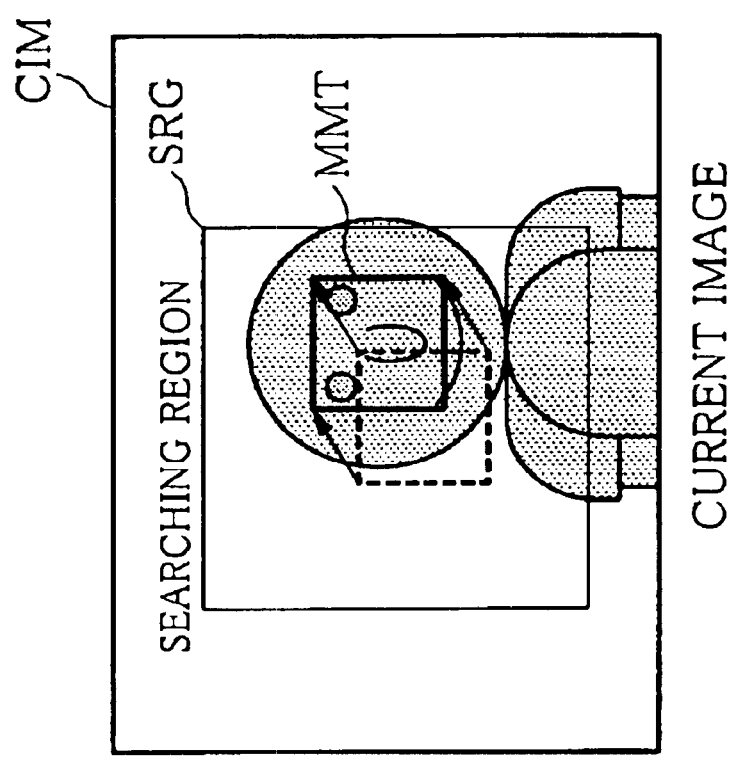
FIGS. 6A and 6B are schematic views for explaining the tracking in the pre-processing circuit.
Figure 6A:
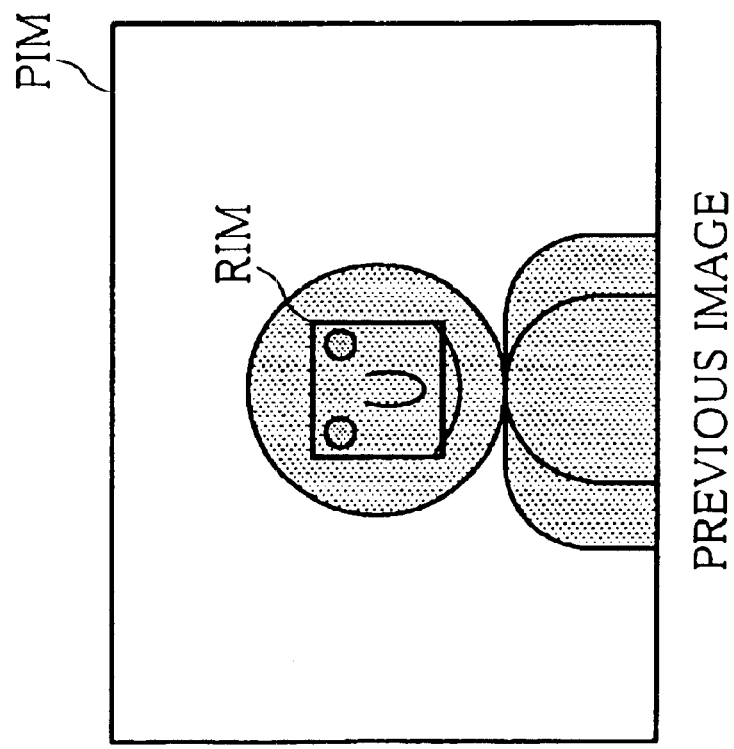

In addition, FIGS. 6A and 6B are schematic views for explaining the tracking processing by the pre-processing circuit.

The pre-processing circuit 503, as shown in FIG. 5, comprises a search region extractor 5031, a binary-coded unit 5032, a pattern matching unit 5033, a reference memory 5034, and a rectangular region extractor 5035.

The search region extractor 5031 extracts a search region SRG as shown in FIG. 6B based on the coordinate information of the reference image RIM of the previous image PIM shown in FIG. 6A and stored in the reference memory 5034.

The binary-coded unit converter 5032 converts the luminance signal of the search region data extracted by the search region extractor 5031 into binary data and outputs it to the pattern matching unit 5033.

The pattern matching unit 5033 performs pattern matching between the luminance information of the binary data of the luminance signal of the search region given by the binary-coded unit 5032 and of the binary data of the reference image RIM of the previous image PIM shown in FIG. 6A and stored in the reference memory 5034 and outputs the results to the rectangular region extractor 5035.

The pattern matching processing employs the image data MMT at a position giving the highest consistency in the search region SRG as shown in FIG. 6B and uses it as the tracking results of the current image CIM.

In addition, the pattern matching unit 5033 stores the tracking results at the present stage, that is, the image data MMT at a position giving the highest consistency, into the reference memory 5034 as a reference image for the next image.

The rectangular region extractor 5033 cuts out a certain rectangular region surrounding the tracking results MMT obtained by the pattern matching unit 5033, and outputs the same.

In the pre-processing circuit 503 having such a configuration, tracking of the input image is performed in order to maintain a desired image state (hereinafter referred to as an "initial reference image") that a user wishes to transmit.

Then, the tracking operation is performed at a frame rate the same as or higher than the transmission frame rate, and a reference image serving as a reference for tracking is refreshed successively.

The tracking in the pre-processing circuit 503 is started when information of an initial reference image (described later with reference to FIGS. 7A to 7C and FIGS. 8A to 8C) is transmitted from the CPU 516.

First, in the input image data (the current image) CIM newly input from the camera 502 as shown in FIG. 6B, a search region SRG is extracted by the search region extractor 5031 based on the coordinate information of the reference image RIM of the previous image PIM stored in the reference memory 5034.

Next, the luminance signal of the extracted data is converted into binary data in the binary-coded unit 5033, then pattern matching of luminance information is performed by the pattern matching unit 5033 between the luminance signal of the extracted data and the binary-coded data of the reference image RIM stored in the reference memory 5034.

The tracking results at this time, namely, the image data MMT at a position giving the highest consistency, is stored in the reference memory 5034 as a reference image of the next image.

Then, the rectangular region extractor 5035 cuts out and outputs a rectangular region surrounding the tracking result MMT obtained by the pattern matching unit 5033.

Next, first and second methods for determination of the initial reference image will be explained with reference to FIGS. 7A to 7C and FIGS. 8A to 8C.

The first method of determination determines the image by monitoring the image to be transmitted the image size frame.

Figure 7C:
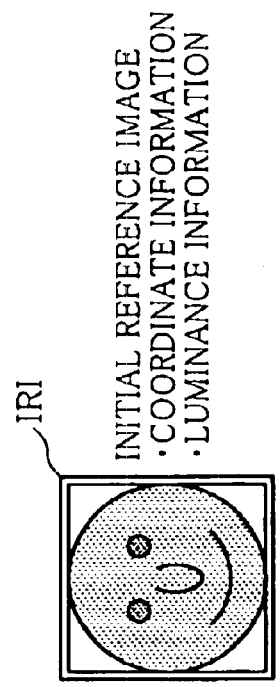
FIGS. 7A to 7C are views for explaining a first method for determination of an initial reference image.
Figure 7B:
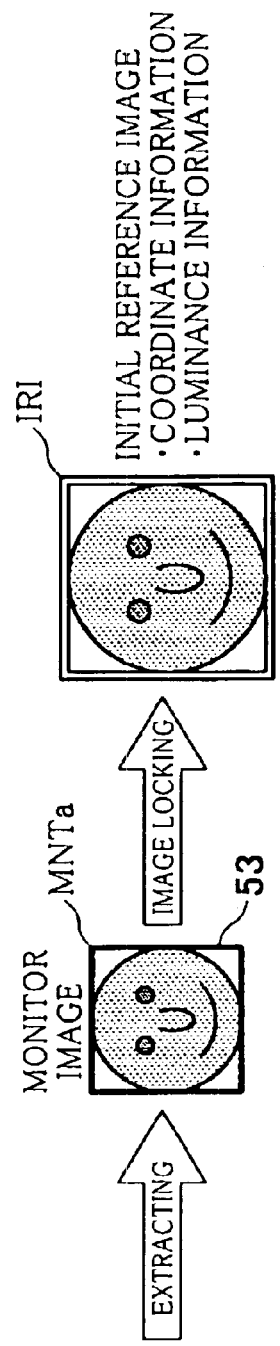
Figure 7A:
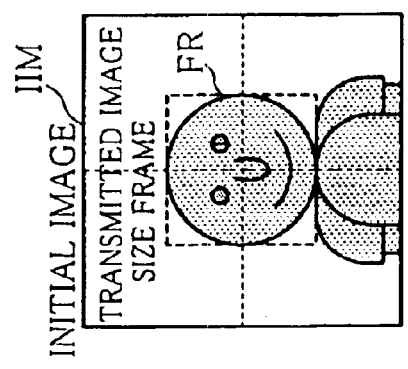

In more detail, as shown in FIG. 7A, a transmission image size frame FR is set beforehand in the initial image IIM. The image in the frame FR is output as a monitor image MNTa and, as shown in FIG. 7B, is displayed on the display monitor 53 by the displaying circuit 513 in FIG. 4.

The user views the output on the monitor and when a desired image state is found, for example presses the switch 56 to issues a command for locking the image. Therefore, as shown in FIG. 7C, the initial reference image IRI is decided.

On the other hand, the second method of determination decides on the image by monitoring a reduced image.

Figure 8A:
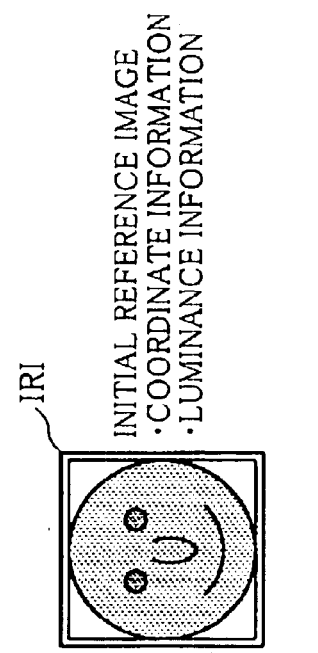
FIGS. 8A to 8C are views for explaining a second method for determination of an initial reference image.
Figure 8B:
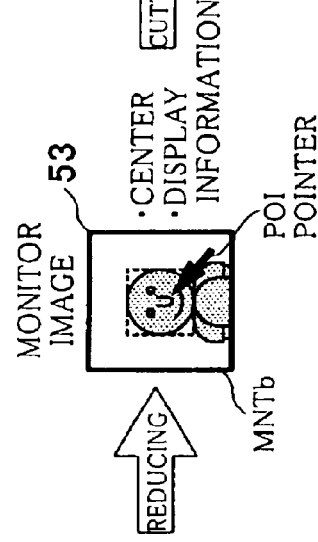
Figure 8C:
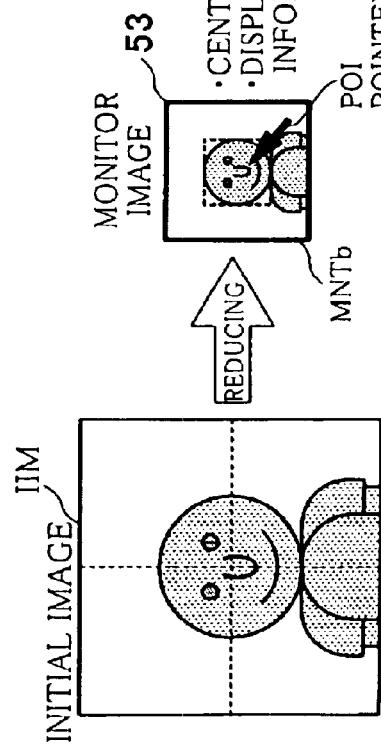

In more detail, as shown in FIG. 8A, the initial image IIM is reduced and output as a monitor image MNTb as shown in FIG. 8B. The reference center desired by the user and the display region (the region occupied by the image) are specified using a pointer POI to decide the initial reference image IRI.

Note that, the instruction for moving the pointer POI on the display monitor 53 is executed by using for example a ball switch, that is, the switch 56. Namely, by rotating the switch 56 in a desired direction, the pointer POI is moved up, down, left, right, or in an inclined direction.

Information on the initial reference image decided by the first or the second method in this way is sent from the GUI interface circuit 515 to the reference memory 5034 of the pre-processing circuit 503 through the CPU 516.

Further, in FIG. 4, the video compressor and coder 504 compresses and codes the transmitted image data extracted by the pre-processing circuit 503 and outputs it to the multiplexer 506.

The voice compressor and coder 505 compresses and codes the voice data from the microphone 501 and outputs it to the multiplexer 506.

The multiplexer 506 multiplexes the image data to be transmitted, which was compressed and coded by the video compressor and coder 504, and the voice stream compressed and coded by the voice compressor and coder 505 and outputs the data to the transmission circuit 507.

The transmission circuit 507 converts and modulates the image and voice data multiplexed by the multiplexer 506 into a specific transmission protocol and transmits it to the mobile base station (MBS) 61-1 or 61-2.

The reception circuit 508 receives and demodulates the transmitted signal sent from the other communication party through the transmission channel 60, decompresses the transmission protocol, and outputs the result to the demultiplexer 509.

The demultiplexer 509 separates the image data and the voice data from the reception circuit 508 and supplies the obtained image data stream and the voice data stream to the video decoding circuit 510 and the voice decoding circuit 511, respectively.

The video decoding circuit 510 decodes the image data stream separated by the demultiplexer 509 and outputs it to the image combining circuit 512.

The voice decoding circuit 511 decodes the voice data stream separated by the demultiplexer 509 and outputs it to the speaker 514 for reproduction.

The image combining circuit 512 combines the face image data of a user of a terminal from the pre-processing circuit 503 and the face image data of for example the other party from the video decoding circuit 510 or a specified content image from the application service provider (ASP) 66 and outputs the result to the display circuit 513.

The display circuit 513 receives the combined image from the image combining circuit 512, displays on the display monitor 53 of the terminal 50-1 (or 50-2), as shown in FIG. 3 and FIG. 4, a user's own face image and a transmitted face image of his other party for example side by side above the lens of the camera module 54, and displays the specified content image below the lens.

The GUI interface circuit 515 includes a switch 56. The CPU 516 controls the entire terminal 50-1 (or 50-2) according to the instructions from the user to shift to the image lock state, switch the display on the monitor, and so on.

Next, the operation of the terminal 50 of FIG. 4 will be described.

For example, an image of the upper part of a user's body is captured by the camera module 54 through its lens. This is converted from an optical signal into an electrical signal by the camera circuit 502 and output to the pre-processing circuit 503 as the digital image signal S502.

The image data of the upper part of the user's body is supplied to the display circuit 513 through the image combining circuit 512. The image of the upper part of the user's body, that is, the initial image IIM, is then displayed on the display monitor 53.

While viewing the image of the upper part of his or her own body, that is, the initial image IIM, the user decides on an initial reference image IRI by for example the first method, namely, monitoring the size frame of the image to be transmitted image.

That is, the transmission image size frame is set beforehand in the initial image IIM, and the image in the frame FR is output as a monitor image MNTa and displayed on the display monitor 53 by the display circuit 513.

Then, the user views the output on the monitor and when finding a desired image state, for example presses the switch 56 to issues a command for locking the image to the CPU 516 to thereby decide on the initial reference image IRI.

Then, when the initial reference image information is transmitted from the CPU 516, tracking is started in the pre-processing circuit 503.

In this state, in the input image data (the current image) CIM newly input from the camera circuit 502, a search region SRG is extracted by the search region extractor 5031 based on the coordinate information of the reference image RIM of the previous image PIM stored in the reference memory 5034.

Next, the luminance signal of the extracted data is converted into binary data by the binary-coded unit 5033, then pattern matching of the luminance information is performed by the pattern matching unit 5033 between the luminance signal of the extracted data and the binary data of the reference image RIM stored in the reference memory 5034. This processing result is stored in the reference memory 5034 as a reference image of the next image.

Then, the rectangular region surrounding the tracking result MMT obtained with the pattern matching unit 5033 is cut off in the rectangular region extractor 5035 and it is output to the video compressor and coder 504 and the image combining circuit 512.

In such a state, the voice input from the microphone 501 is converted into digital and then is compressed by the voice compressor and coder 505.

Then, the image data obtained from the pre-processing circuit as described above is compressed and coded by the image compressor and coder 504, multiplexed by the multiplexer 506 together with the compressed voice stream, and then output to the transmission circuit 507.

After that, the transmission circuit 507 receives the multiplexed data, the transmission protocol, transmits the result for example to the mobile base station 61-1, and transmits it by the transmission channel 60 to for example the terminal 50-2 of the other party.

In addition, in the reverse order, the transmitted signal from the other party is received by the reception circuit 508, demodulated, has its transmission protocol decompressed, then is separated into the image data stream and the voice data stream by the demultiplexer 509.

The separated voice data stream is decoded by the voice decoding circuit 511 and sent to the speaker 514 for reproduction.

The image data stream is decoded by the video decoding circuit 510, then is combined with the user's own image from the pre-processing circuit 503 by the image combining circuit 512. The combined image data is output to the display circuit 513 and displayed on the display monitor 53.

At this time, the display monitor 53 displays the user's own face image and a transmitted face image of the other party are displayed for example side by side above the lens of the camera module 54 on the display monitor 53 and displays a specified content image is displayed below the lens.

As described above, according to the first embodiment, during communication between terminals 50-1 and 50-2, the target image is compressed and transmitted after being adjusted to fully fill the frame of the transmitted image, so the amount of information can be greatly reduced while transmitting the expression of the other party, which is needed most for the communication.

In addition, because the face image is adjusted to fully fill the frame, transmission of the high resolution background image can be naturally eliminated, and the amount of information after compression can be largely reduced further. Consequently, it is possible to transmit an image of a high quality.

Further, the frame correlation of images can be increased greatly. By using a compression technique of interframe compression like MPEG for the image compression method, the amount of information can be dramatically reduced and therefore it becomes possible to transmit an image of a high quality.

Further, the image state that a user desires to transmit (image locking state) can be kept automatically. This helps detecting the characteristic portion of the image and enables tracking of the target image such as the image of the person. As a result, the time correlation of images is increased, and the amount of information after compression can be decreased, and so it becomes possible to transmit an image of a high quality.

Further, since face images and content for common discussion are arranged at the upper and lower portions of the display monitor 53 and since a lens part of the camera module 54 is provided between them, a state can be realized where the speakers are in better eye contact.

Further, the state of the users talking while viewing an image for discussion can be transmitted. Further, there is an advantage that virtual reality communication where the users maintain eye contact by looking at each others' faces on the monitor can be realized.

Furthermore, in the transmission channel 60, an application service provider (ASP) 66 able to distribute content may be started up and the same images of content CONT provided by the application service provider 66 may be output to the terminals 50-1 and 50-2 through the gateway 65.

Second Embodiment

Figure 9:
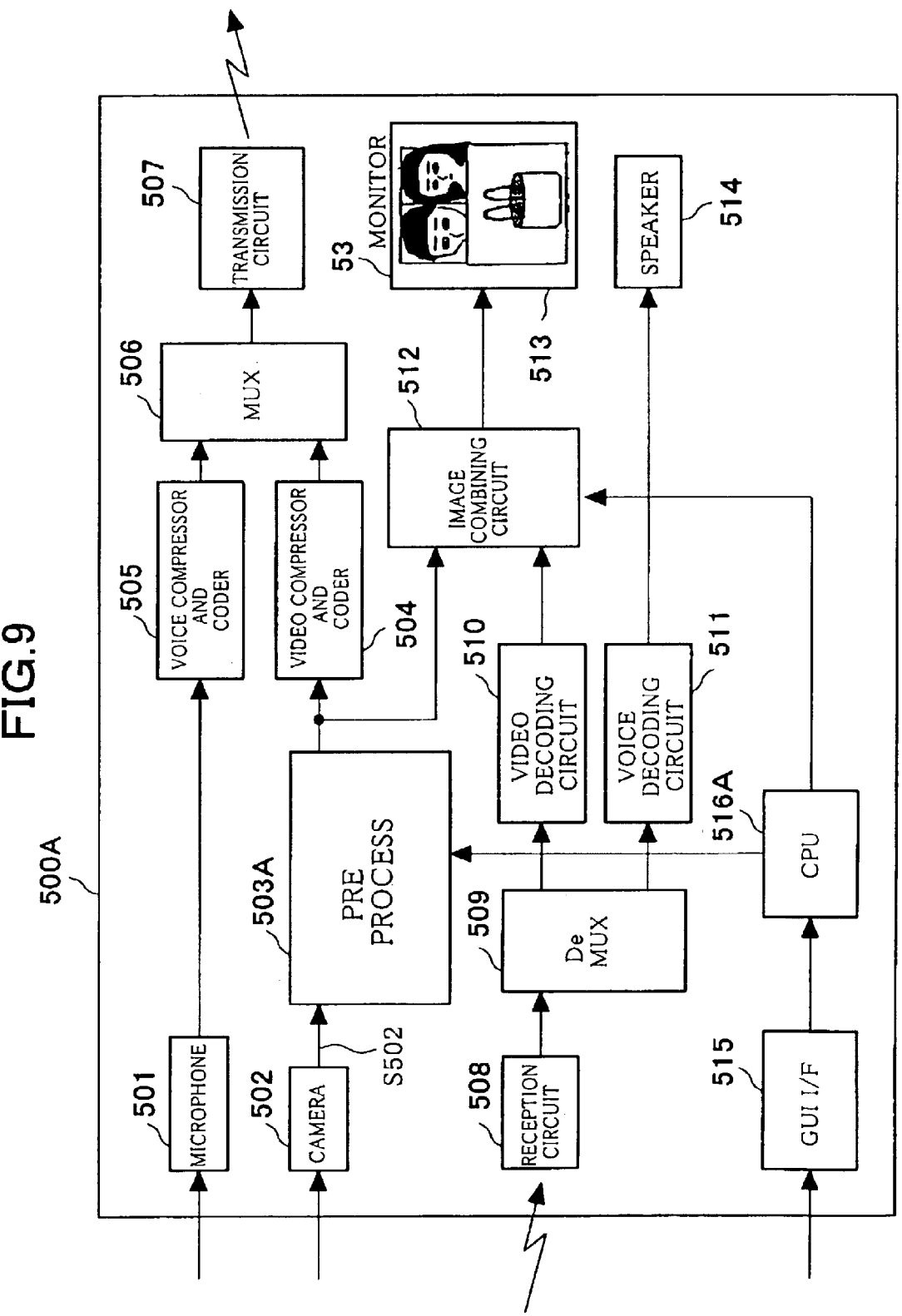
FIG. 9 is a circuit diagram of a second embodiment of a signal processing system of a terminal as a data transmission apparatus according to the present invention.

FIG. 9 is a circuit diagram of a second embodiment of the signal processing system of a terminal functioning as a data transmission apparatus according to the present invention.

The point of difference of the signal processing system of a terminal according to the second embodiment and the aforesaid signal processing system of according to the first embodiment lies in the processing of the pre-processing circuit 503A and the CPU 516A.

Specifically, during communication, a part of the face is detected in the input image, the size of the face is calculated from that information, the image is enlarged or reduced so that the face image fully fills the monitor, then the face image is cut out.

In this case, the image of the characteristic portion of the image to be transmitted is used to calculate the distance of the characteristic portion and this used for enlarging, reducing, or tracking the image.

Particularly, in case of a face image, for example, the portion of the eyes is taken out for the characteristic portion, the rate of enlargement or reduction of the image is determined from the distance between the two eyes so that the distance becomes the same as that in a reference image, then the image is tracked. In addition, as the characteristic portion, use may be made of at least part of the eyes, nose, mouth, ears, or outline of the face and the image enlarged, reduced, or tracked from their sizes and distances.

The rest of the configuration is the same as that shown in FIG. 4. Therefore, in FIG. 9, components the same as in FIG. 4 are shown with the same reference numerals.

Namely, the signal processing system 500A of a terminal, as shown in FIG. 9, has a microphone 501, a camera circuit 502, a pre-processing circuit 503A, a video compressor and coder 504, a voice compressor and coder 505, a multiplexer (MUX) 506, a transmission circuit 507, a reception circuit 508, a demultiplexer (DeMUX) 509, a video decoding circuit 510, a voice decoding circuit 511, an image combining apparatus 512, a display circuit 513, a speaker 514, a GUI interface (I/F) circuit 515, and a CPU 516A.

Because the functions of the pre-processing circuit 503A and the CPU 516A are different from those in the first embodiment, below, only the functions of the pre-processing circuit 503A and the CPU 516A will be described in detail. Descriptions of other components will be omitted.

Figure 10:
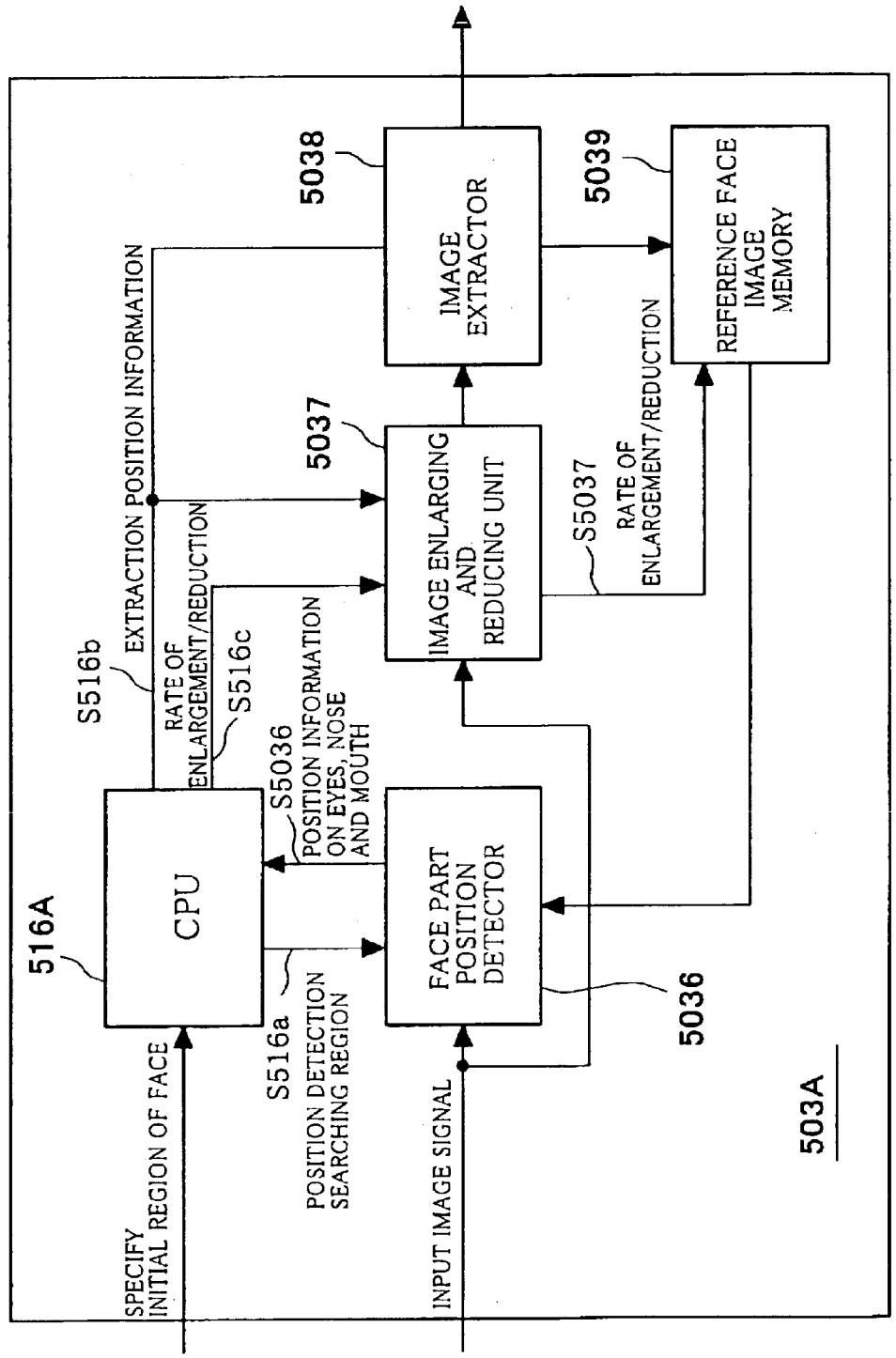
FIG. 10 is a circuit diagram of a pre-processing circuit in FIG. 9 according to the second embodiment.

FIG. 10 is a circuit diagram of an example of the specific configuration of the principal portion of the pre-processing circuit according to the second embodiment.

For easy understanding, the CPU 516A is also illustrated in FIG. 10.

The pre-processing circuit 503A, as shown in FIG. 10, has a face part position detector 5036, an image enlarging and reducing unit 5037, an image extractor 5038, and a reference face image memory 5039.

The face part position detector 5036 detects the position of parts of the face such as the two eyes, nose, mouth, eyebrows, ears, and the outline of the face within the information on the initial range of the face position by the CPU 516A, that is, a face part search region, by using information on luminance and colors and supplies the detected face part position information S5036 to the CPU 516A.

The image enlarging and reducing unit 5037 enlarges or reduces the input image based on the rate of enlargement or reduction calculated by the CPU 516A and supplies the same to the image extractor 5038.

The image extractor 5038 cuts out the face image in the region displayed on the monitor screen from the enlarged or reduced image based on the face position information (coordinates) already sent from the CPU 516A.

The cut out face image is sent to the reference face image memory 5039. At this time, a reference image is made from the rate of enlargement or reduction of the image.

Next, a description will be given of the operation of the pre-processing circuit 503A, including the processing of the CPU 516A with reference to FIG. 11 to FIG. 16.

Figure 11:
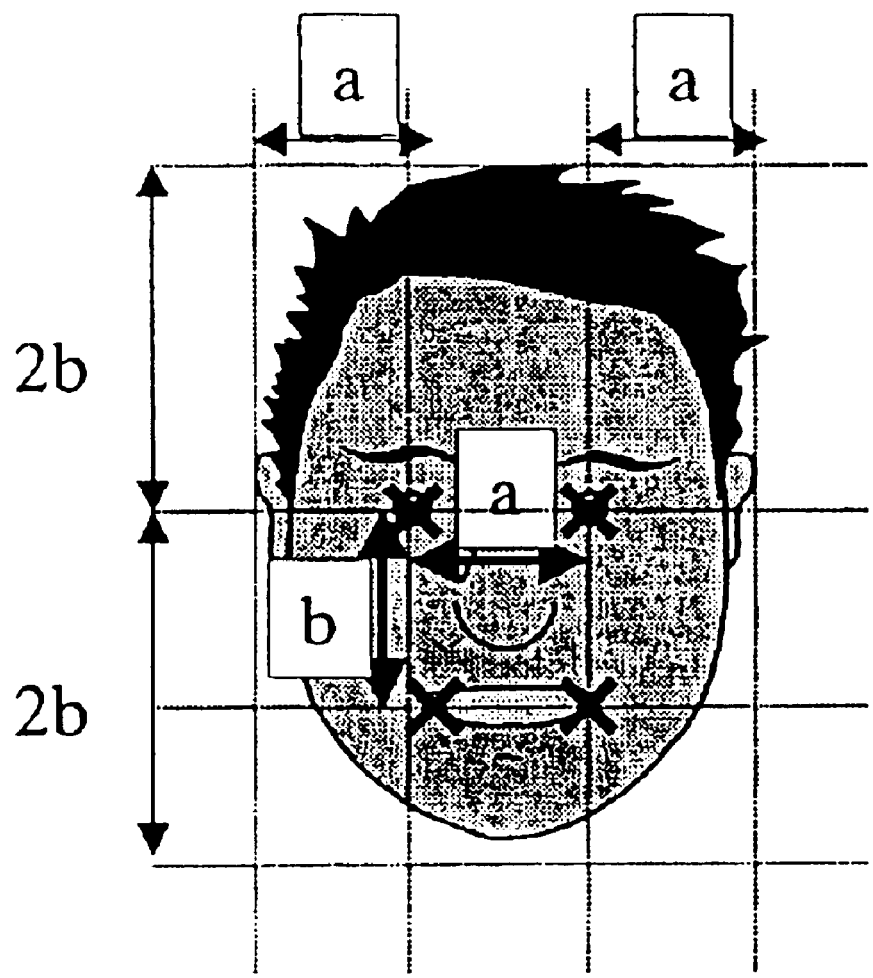
FIG. 11 is a view for explaining an example of calculating a face size.
Figure 12:
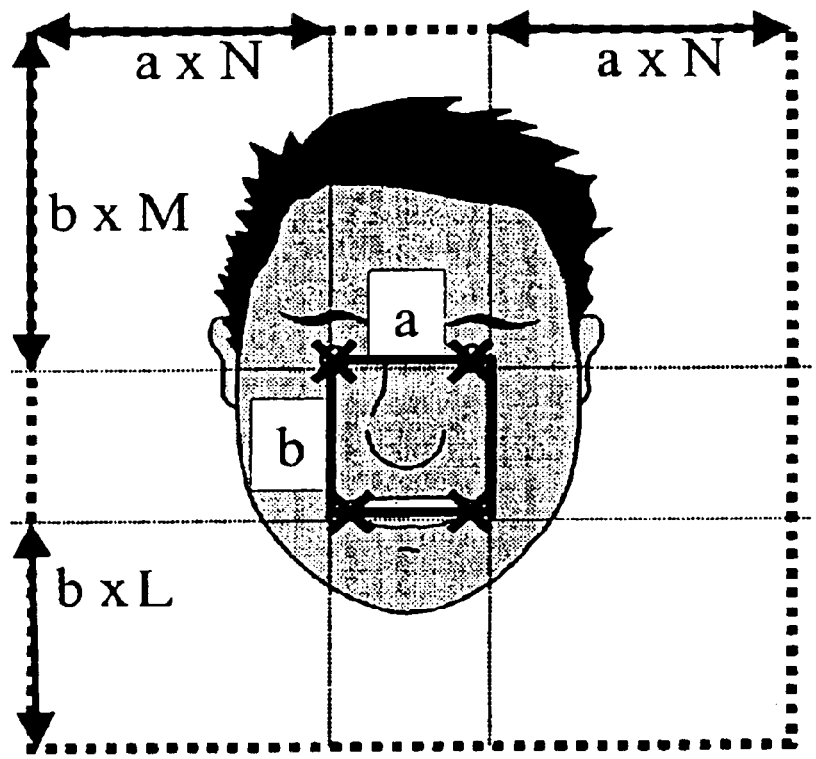
FIG. 12 is a view for explaining an example of a face part detection search region.
Figure 13:
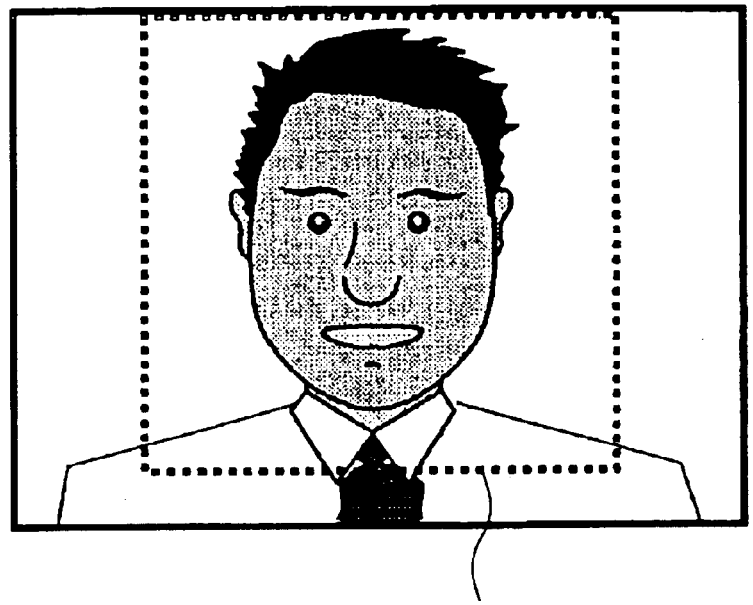
FIG. 13 is a view for explaining processing for reducing a face image in a face part detection search region and displaying the same on a display monitor.
Figure 14:
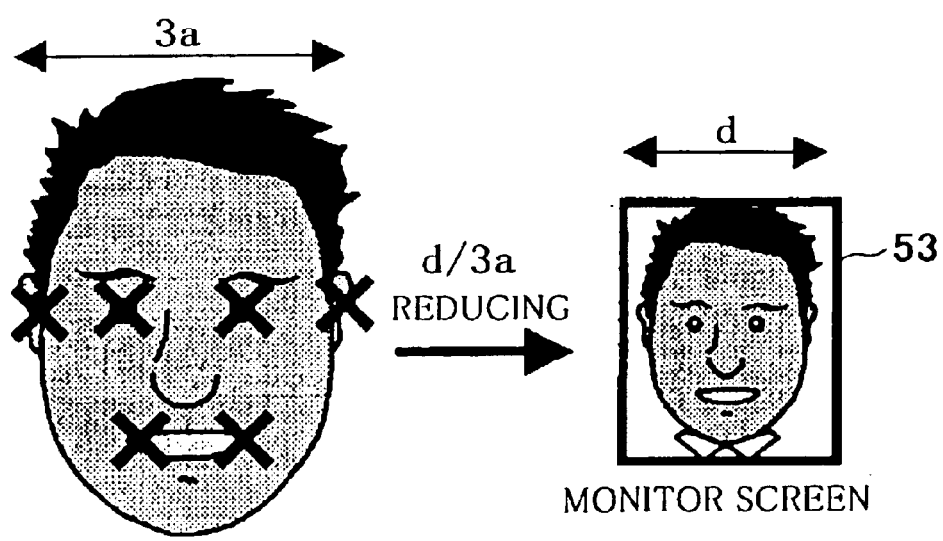
FIG. 14 is a view for explaining processing for reducing a face image in a face part detection search region and displaying the same on a display monitor.
Figure 15:
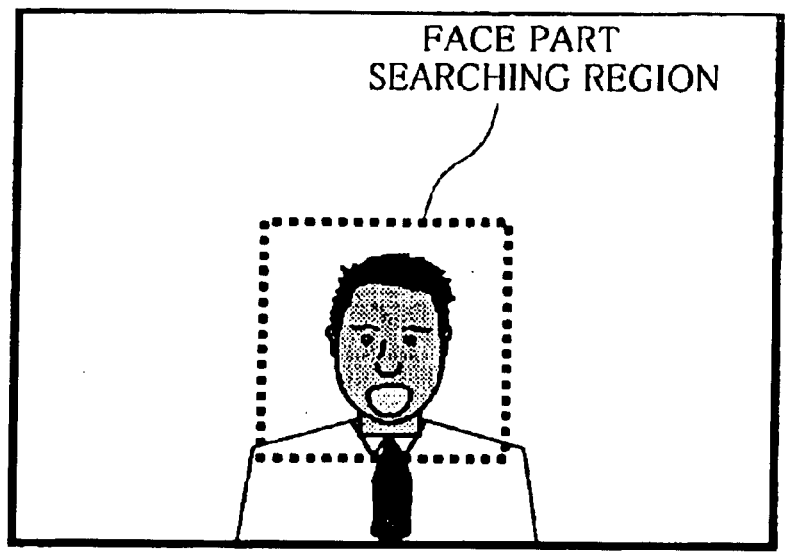
FIG. 15 is a view for explaining processing for enlarging a face image in a face part detection search region and displaying the same on a display monitor.
Figure 16:
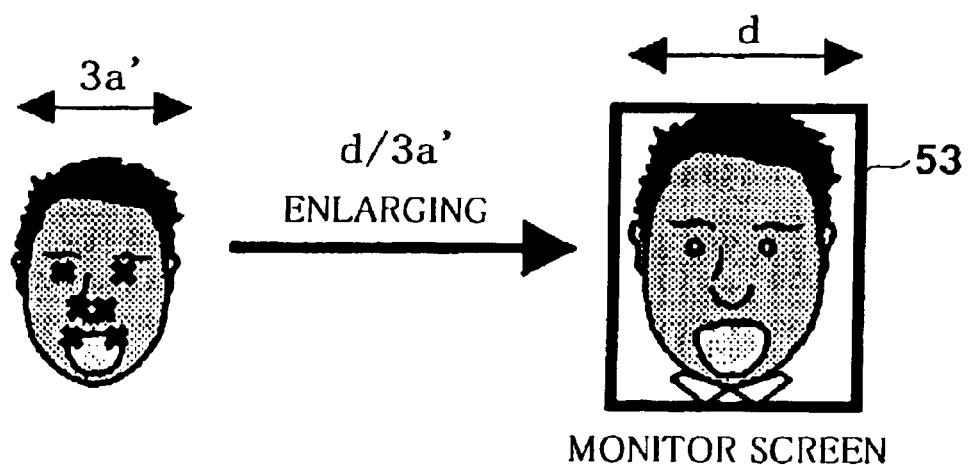
FIG. 16 is a view for explaining processing for enlarging a face image in a face part detection search region and displaying the same on a display monitor.

FIG. 11 is a view of an example for explaining the calculation of a face size, FIG. 12 is a view of an example for explaining the search region for face part detection, FIG. 13 and FIG. 14 are views for explaining processing for reducing and displaying a face image in a search region for face part detection on a display monitor, and FIG. 15 and FIG. 16 are views for explaining processing for enlarging and displaying a face image in a search region for face part detection on a display monitor.

First, for the first input image (the initial image), information on the initial region of the face position is supplied to the CPU 516A by instructions by a user through the GUI interface circuit 515 (switch 56).

In the CPU 516A, the transmitted initial region is supplied to the face part position detector 5036 as a face part detection search region signal S516a.

In the face part position detector 5036, the position of parts of the face such as the two eyes, nose, mouth, eyebrows, ears, and outline of the face is detected in the supplied face part search region by using information on luminance and colors. Then, the position information on the face parts detected in the face part detector 5036 is supplied to the CPU 516A as a signal S5036.

In the CPU 516A, the size of the face in the image is calculated based on the position information of the face parts.

For example, as shown in FIG. 11, if denoting the distance between the detected two eyes as "a" and the perpendicular distance between the eyes and the mouth as "b", the size of the face is set to 3a in the horizontal direction and 4b in the vertical direction.

Note that in this case, it is also possible to detect the color of the face to extract the contour and calculate the size of the face from that size.

Further, in the CPU 516A, the face part detection search region of the next image is calculated based on the position information of the face parts.

For example, as shown in FIG. 12, assume the region of ±a×N horizontally and +b×M and −b×L vertically around the rectangle a×b including the two eyes and the mouth is the face part detection search region of the next image.

Note that the search region cannot be larger than the input image.

From the second input image and on, the face part detection search region obtained in the previous image is supplied to the face part position detector 5036 by the CPU 516A.

In the face part position detector 5036, the position of face parts is detected in the same way as above in the supplied search region.

At this time, information of the face portion of the previous image stored in the reference face image memory 5039 is used as a reference image for detection of the face parts.

Then, the position information on face parts detected in the face part detector 5036 is supplied to the CPU 516A as a signal S5036.

Then, in the same way as the initial image, the size of the face in the image and the face part detection search region of the next image are calculated in the CPU 516A.

FIG. 13 and FIG. 15 show the search regions of face parts.

Next, in the CPU 516A, the rate of enlargement or reduction is calculated from the calculated size of the face.

This rate is that for enlarging or reducing the face so that the face image just fully fills the screen of the monitor on which the user's face is displayed.

For example, as shown in FIG. 14, since the size of the face is 3a in the horizontal direction and the size of the screen is d in the horizontal direction, the reduction rate d/3 is obtained.

In addition, in FIG. 16, the enlargement rate d/3a' is obtained.

The rate calculated by the CPU 516A is supplied to the image enlarging and reducing unit 5037 as a signal S516c.

In the image enlarging and reducing unit 5037, the input image is enlarged or reduced based on the signal S516c.

The enlarged or reduced image is supplied to the image extractor 5038. In the image extractor 5038, the face image in the region displayed on the monitor screen from the enlarged or reduced image is cut out based on the face position information (coordinates) that has already been sent from the CPU 516A as the signal S516b.

FIG. 14 and FIG. 16 show the cases in which the face size in the input image is larger than the monitor screen and the face size is smaller than the monitor screen, respectively.

Although the sizes of the faces in the input images are different, the sizes of the face images displayed on the monitor screen are the same.

The cut out face image is supplied to the video compressor and coder 504 and the later image combining circuit 52.

Further, the cut out face image is sent to the reference face image memory 5039. At this time, a reference image is constructed from this image and the rate of enlargement or reduction.

According to the second embodiment, similar effects as the first embodiment can be obtained.

Third Embodiment

Figure 17:
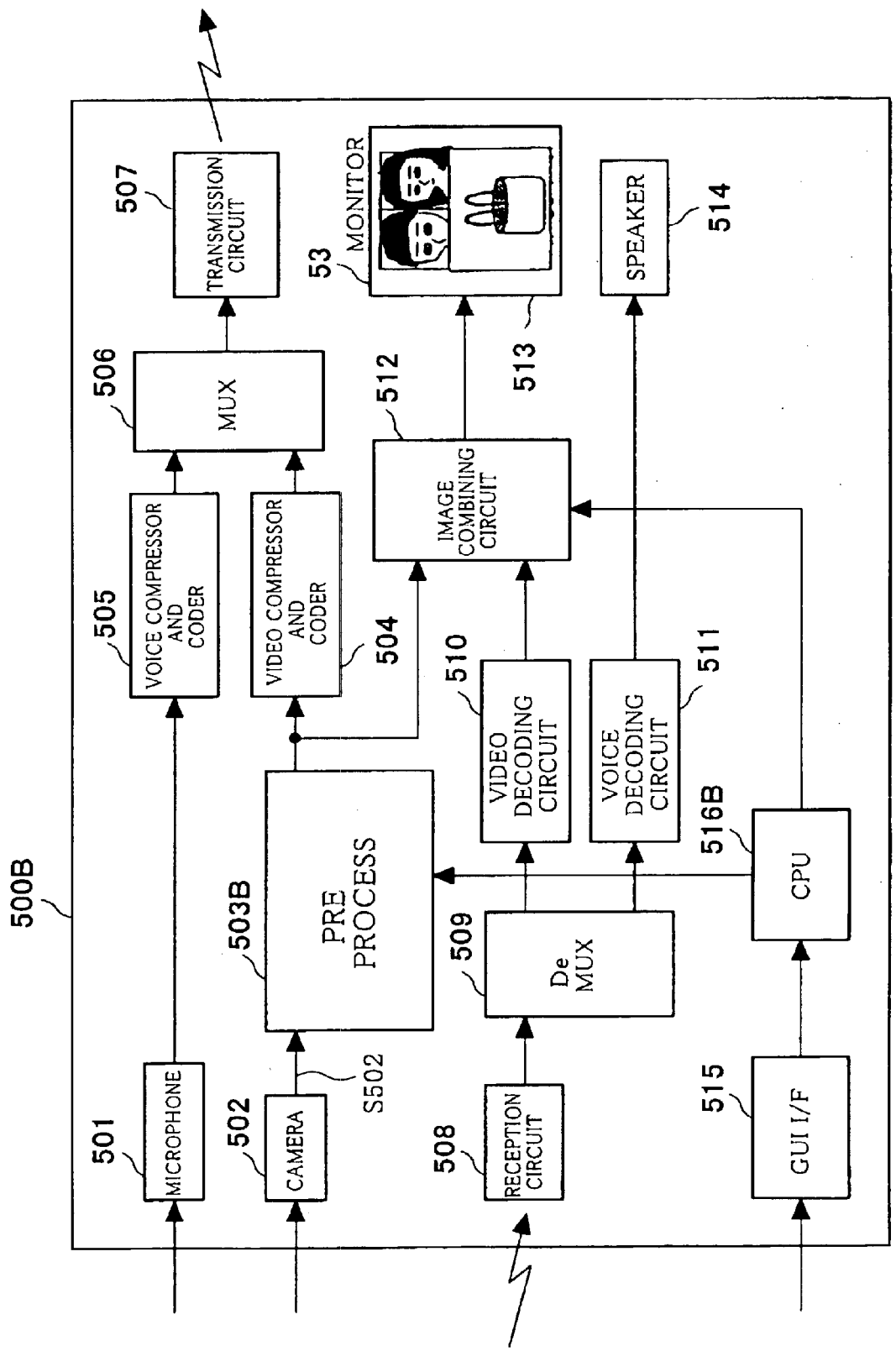
FIG. 17 is a circuit diagram of a third embodiment of a signal processing system of a terminal as a data transmission apparatus according to the present invention.

FIG. 17 is a circuit diagram of a third embodiment of the signal processing system of a terminal functioning as a data transmission apparatus according to the present invention.

Figure 18:
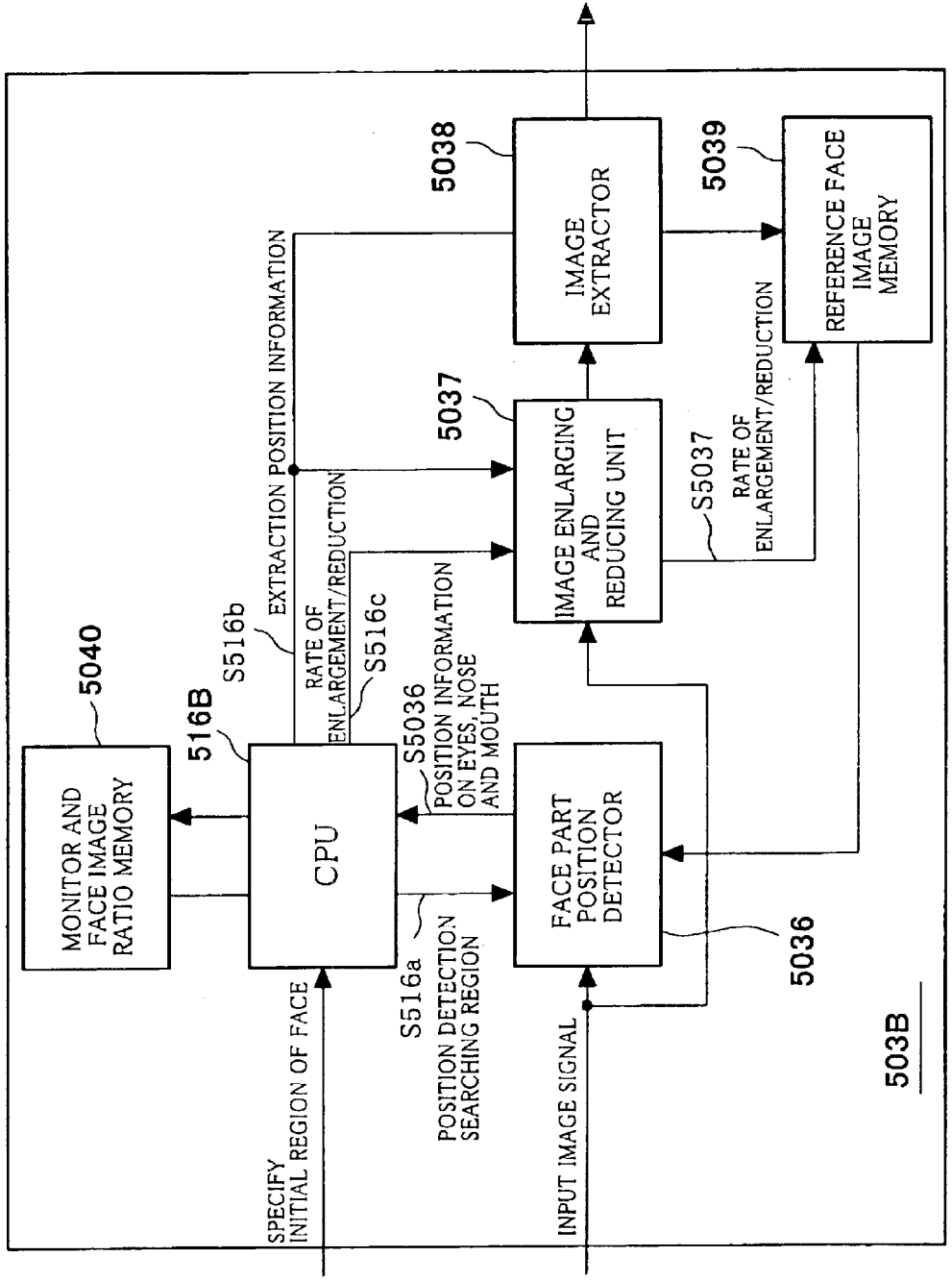
FIG. 18 is a circuit diagram of a pre-processing circuit in FIG. 17 according to the third embodiment.

FIG. 18 is a circuit diagram of an example of the specific configuration of the principal portion of the pre-processing circuit according to the third embodiment.

The point of difference between the signal processing system of a terminal according to the third embodiment and the aforesaid signal processing system according to the second embodiment lies in the processing of the pre-processing circuit 503B and the CPU 516B.

Specifically, the face image is enlarged or reduced and the face image is cut out so that the face image is constantly maintained to a size specified by the user.

For this, the pre-processing circuit 503B is configured to have add a monitor/face image ratio memory 5040 to the circuit in FIG. 10.

The rest of the configuration is the same as that shown in FIG. 9 and FIG. 10. Therefore, in FIG. 17 and FIG. 18, components the same as those in FIG. 9 and FIG. 10 are shown by the same reference numerals.

Namely, the signal processing system 500B of a terminal, as shown in FIG. 17, has a microphone 501, a camera circuit 502, a pre-processing circuit 503B, a video compressor and coder 504, a voice compressor and coder 505, a multiplexer (MUX) 506, a transmission circuit 507, a reception circuit 508, a demultiplexer (DeMUX) 509, a video decoding circuit 510, a voice decoding circuit 511, an image combining apparatus 512, a display circuit 513, a speaker 514, a GUI interface (I/F) circuit 515, and a CPU 516B.

The pre-processing circuit 503B, as shown in FIG. 18, has a face part position detector 5036, an image enlarging and reducing unit 5037, an image extractor 5038, a reference face image memory 5039, and a monitor/face image ratio memory 5040.

Because the functions of the pre-processing circuit 503B and the CPU 516B are different from those in the second embodiment, below, only the functions of the pre-processing circuit 503B and the CPU 516B will be described in detail. Descriptions of other components will be omitted.

The monitor/face image ratio memory 5040 stores values for calculating the size of the face to be displayed on the monitor screen and the position of the face in the monitor screen based on the position information on face parts extracted by the CPU 516B. The stored data is used as a reference value in the second input image and on.

Next, the operation of the pre-processing circuit 503B, including the processing of the CPU 516B, will be described with reference to FIG. 19 to FIG. 23.

Figure 19:
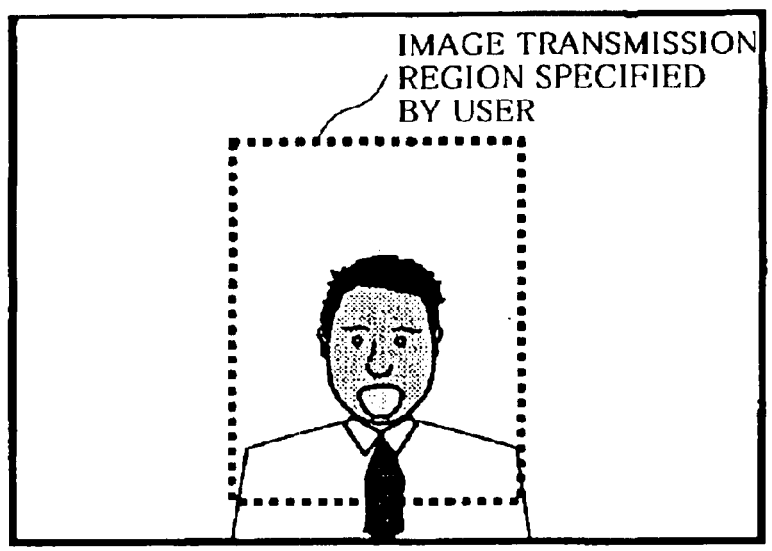
FIG. 19 is a view for explaining processing for reducing a face image in a specified an image transmission region and displaying it on a display monitor according to the third embodiment.
Figure 20:
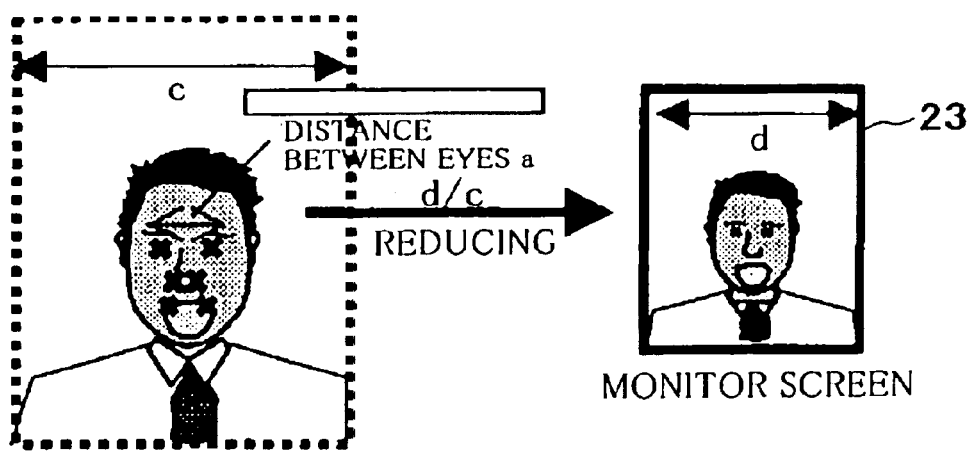
FIG. 20 is a view for explaining processing for reducing a face image in a specified an image transmission region and displaying it on a display monitor according to the third embodiment.
Figure 21:
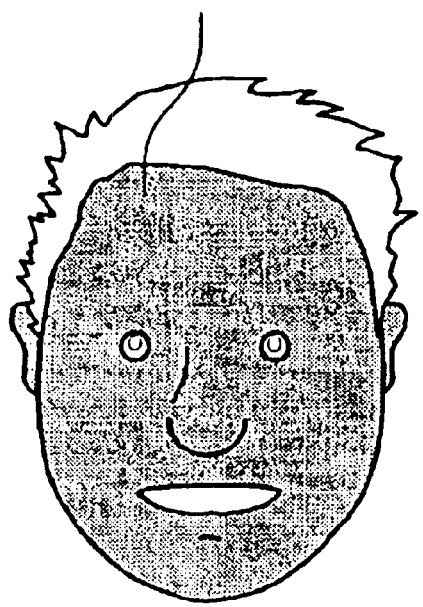
FIG. 21 is a view for explaining a ratio of pixels "e" of a face color over pixels "f" in an image on a monitor according to the third embodiment.
Figure 22:
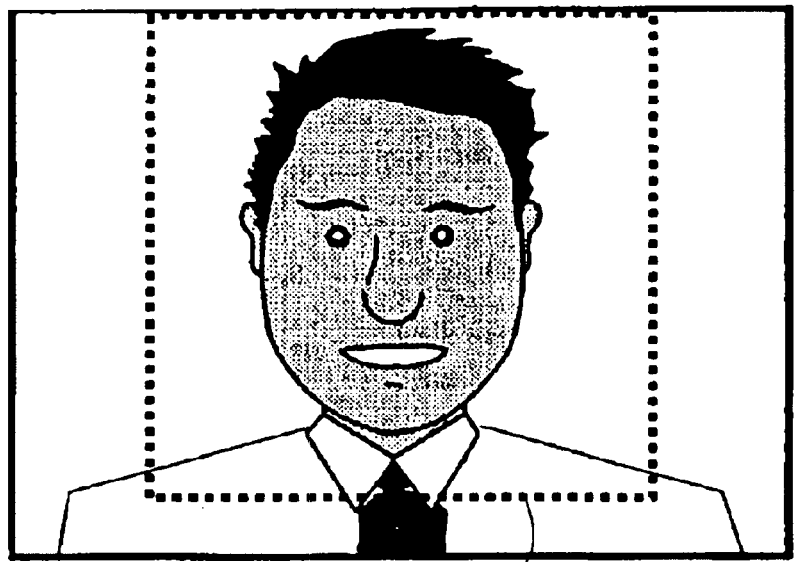
FIG. 22 is a view for explaining processing for reducing a face image in a face part detection search region and displaying it on a display monitor according to the third embodiment.
Figure 23:
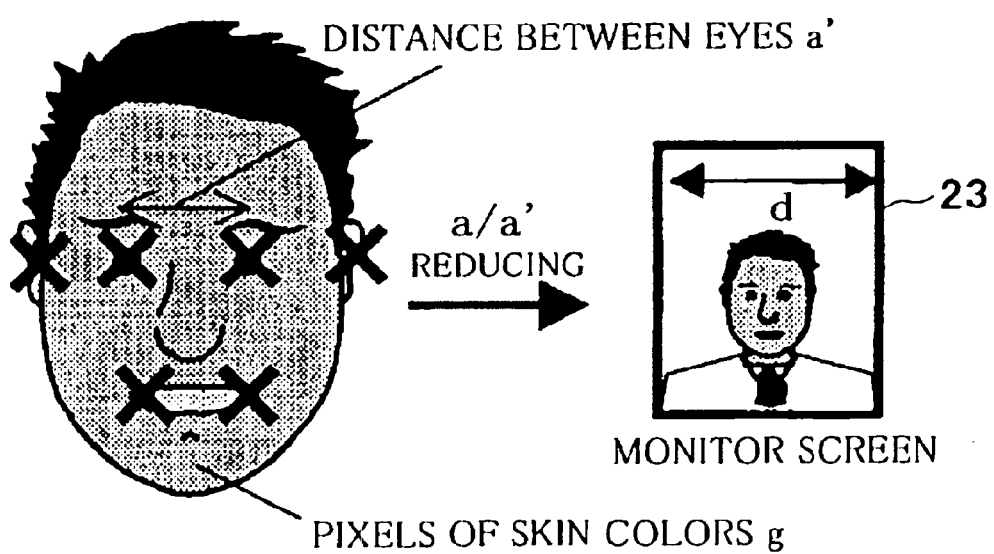
FIG. 23 is a view for explaining processing for reducing a face image in a face part detection search region and displaying it on a display monitor according to the third embodiment.

FIG. 19 and FIG. 20 are views for explaining processing for reducing a face image in a specified image transmission region and displaying it on a display monitor, FIG. 21 is a view for explaining the ratio of the pixels "e" of face color over the pixels "f" in the image on the monitor, and FIG. 22 and FIG. 23 are views for explaining processing for reducing a face image in a face part detection search region and displaying it on a display monitor.

First, the user specifies the region of his or her own face desired to be displayed on the monitor (desired to be transmitted) in the first input image (the initial image) on for example the GUI of the display monitor. This information on the region is supplied to the CPU 516B.

The region is easy for the user to specify is resembling the monitor.

In the CPU 516B, the supplied initial region is supplied to the face part position detector 5036 as a face part detection search region signal S516a.

In the face part position detector 5036, the position of parts of the face such as the two eyes, nose, mouth, eyebrows, ears, and outline of the face is detected in the supplied face part search region. The position information on face parts detected in the face part detector 5036 is supplied to the CPU 516B as a signal S5036.

In the CPU 516B, the size of the face displayed on the monitor screen and values for calculating the position of the face in the monitor are extracted based on the position information of face parts.

For example, in the first input image (the initial image), as shown in FIG. 20, the horizontal length "c" of the region specified by the user, the distance "a" between the detected two eyes in the initial image, and the horizontal length "d" of the display monitor 53 can be used.

Further, as shown in FIG. 21, it is possible to detect the face color and calculate the ratio of the pixels "e" of face color over the pixels "f" in the image on the monitor.

These values are sent to the ratio memory 5040 and used as reference values from the second input image and on.

Note these values may also be stored in the CPU 516B.

Further, in the CPU 516B, the face part detection search region of the next image is calculated based on the position information of the face parts.

For example, in the same way as the second embodiment, as shown in FIG. 12, assume the region of $\pm a \times N$ horizontally and +b×M and −b×L vertically around the rectangle a×b including the two eyes and the mouth is the face part detection search region of the next image.

For the second input image and on, the face part detection search region obtained in the previous image is supplied to the face part position detector 5036 by the CPU 516B.

In the face part position detector 5036, positions of parts of the face are detected in the supplied search region in the same way as the above.

At this time, information of the face portion of the previous image stored in the reference face image memory 5039 is used as a reference image for detection of parts of the face.

The position information on face parts detected in the face part detector 5036 is supplied to the CPU 516B as a signal S5036.

Next, in the CPU 516B, the rate of enlargement or reduction is calculated from the calculated size of the face.

In the first image (initial image), for example, the reduction rate d/c is obtained from the horizontal length "c: of the region specified by the user and the horizontal length "d: of the screen stored in the ratio memory 5040.

For the second image and on, the ratio is calculated from the face position information sent from the face part position detector 5036 and the reference values stored in the ratio memory 5040. For example, as shown in FIG. 23, the reduction rate a'/a is calculated from the distance a' between the two eyes sent from the face part position detector 5036 and the distance "a" between the two eyes in the first image stored in the ratio memory 5040 as a reference value.

Further, the reduction rate may also be found using the skin color pixels "g" from the face part position detector 5036 and the skin color pixels "e" in the initial image stored in the ratio memory 5040.

The rate calculated by the CPU 516B is supplied to the image enlarging and reducing unit 5037 as a signal S516c.

In the image enlarging and reducing unit 5037, the input image is enlarged or reduced based on the signal S516c.

The enlarged or reduced image is supplied to the image extractor 5038. In the image extractor 5038, the face image in the region displayed on the monitor screen from the enlarged or reduced image is cut out based on the face position information (coordinates) already sent from the CPU 516B as the signal S516b.

FIG. 23 shows the state where the size of the face in the input image which is larger than the monitor screen is reduced so as to be displayed at the same as the face size specified by the user in the initial image and where the size of the face image displayed in the monitor screen becomes always the same.

When the face in the input image is smaller than the initial image, it will be enlarged.

The extracted face image is supplied to the later video compressor and coder 504 and image combining circuit 52.

Further, the extracted face image is sent to the reference face image memory 5039. At this time, a reference image is constructed from this image and the rate of enlargement or reduction.

According to the third embodiment, similar effects as the first embodiment can be obtained.

Fourth Embodiment

Next, a specific example of improving the tracking accuracy of an image by fetching and tracking the image at a frame rate the same as or higher than the image to be transmitted and refreshing a reference image serving as a reference for tracking by a rate the same as or higher than the transmission frame rate will be explained as a fourth embodiment of the present invention.

Figure 24:
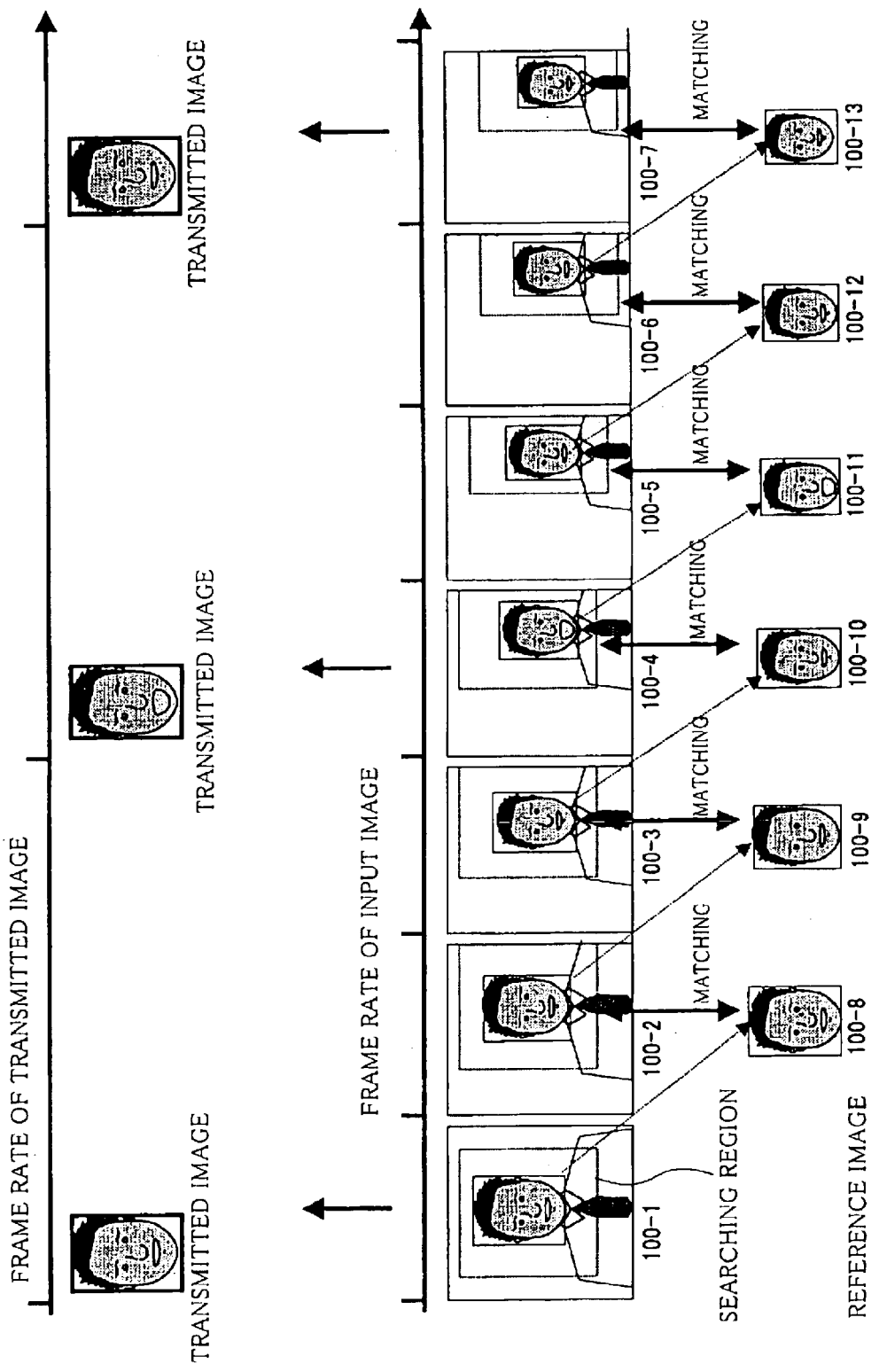
FIG. 24 is a conceptual view for explaining processing for fetching and tracking an image at a frame rate the same as or higher than a transmitted image and refreshing a reference image for tracking at a rate the same as or higher than the transmission frame rate in order to increase a tracking accuracy of the image according to the fourth embodiment.

FIG. 24 is a conceptual view for explaining the processing for improving the tracking accuracy of an image by fetching and tracking the image at a frame rate the same as or higher than the image to be transmitted and refreshing a reference image serving as a reference for tracking by a rate the same as or higher than the transmission frame rate Note that FIG. 24 shows the case in which the frame rate of the image to be transmitted is one-third the input frame rate. In practice, the frame rate ratio is controlled according to the bandwidth of the transmission channel and the congestion state and is not set constant.

In the example of FIG. 24, each input frame is refreshed using the face image of the previous image as a reference image and matching is performed in the search region of the next image.

For example, a face image detected in 100-1 of FIG. 24 is used as the reference image 100-8 of the next image, and matching is performed for 100-8 in the image 100-2 to detect the face image. Then, the face image detected here is used as the next reference image.

Further, from the position of this face image, the search region of the next input image is decided and refreshed.

In accordance with the frame rate of the image to be transmitted, the image to be transmitted is selected from the face image detected in the input frame.

In FIG. 24, face images cut out in images 100-1, 100-4, and 100-7 are transmitted.

When setting the frame rate of image transmission the same as that of reference image refreshing, the time interval between the reference image and the image to be matched becomes longer, therefore there is a possibility that the matching accuracy will become poor for example if the face image becomes gradually smaller, the expression changes drastically, or the face is turned at a slant.

For example, when matching 100-8 and 100-4, the sizes of the face images are different, so the matching accuracy is poor. In addition, when setting the rate of the refreshing of the search region the same as the frame rate of the image to be transmitted, if the face is moved horizontally, sometimes the face image will leave the search region, so there is a possibility the matching accuracy will become poor.

For example, when using the search region of 100-1 for matching 100-4, the face image will not be covered by the search region at all, so the matching accuracy will be poor.

As in the fourth embodiment, if the image is fetched and tracked at a frame rate the same as or higher than the image to be transmitted and a reference image serving as a reference for tracking is refreshed at a rate the same as or higher than the transmission frame rate, the tracking accuracy can be improved.

According to the present invention, the total amount of information can be greatly reduced while transmitting the expression of the other party which is needed most for communication.

In addition, according to the present invention, because the face image is adjusted to fully fill the frame, transmission of the high resolution background image can be naturally eliminated, and the amount of information after compression can be largely reduced. Consequently, it is possible to transmit an image of a high quality.

Summarizing the effects of the invention, according to the present invention, the frame correlation of images is able to be increased greatly. By using a compression technique of interframe compression like MPEG for the image compression method, the amount of information can be decreased drastically, and therefore it becomes possible to transmit an image of a high quality.

In addition, according to the present invention, the image state that a user desires to transmit (image locking state) can be kept automatically. This helps detect the characteristic portion of the image and enables tracking of the target image such as the image of a person. As a result, the time correlation of images is increased, and the amount of information after compression can be decreased. Therefore it becomes possible to transmit an image of a high quality.

Further, according to the present invention, a state can be realized in which the users maintain better eye contact.

Further, according to the present invention, the state of the users talking while viewing an image for discussion can be transmitted. Further, there is an advantage that virtual reality communication where the users maintain eye contact by looking at each others' faces on the monitor can be realized.

While the invention has been described with reference to specific embodiment chosen for purpose of illustration, it should be apparent that numerous modification could be made thereto by those skilled in the art without departing from the basic concept and scope of the invention.

What is claimed is:

1. A data transmission method for transmitting at least image data accommodated in an image frame of a present size, comprising the steps of:
   capturing an image including a target image to be transmitted;
   making adjustments so that the target image to be transmitted from the captured image substantially fully fills the image frame; and
   compressing and transmitting the adjusted image data in the image frame.

2. A data transmission method as set forth in claim 1, wherein when making adjustments so that a target image fully fills an image frame, comprising using an image of a characteristic portion of the image to be transmitted for matching and cutting out the image around the part with the best match for tracking of the image.

3. A data transmission method as set forth in claim 1, wherein when making adjustments so that a target image fully fills an image frame, comprising using an image of a characteristic portion of the image to be transmitted to calculate a distance in the characteristic portion and using this for enlargement, reduction, and tracking of the image.

4. A data transmission method as set forth in claim 2, wherein when detecting a characteristic portion of an image, comprising locking an image in a desired image state while monitoring a state of input of the image to be transmitted and using a center portion of the locked image as the characteristic portion of the image.

5. A data transmission method as set forth in claim 3, wherein when detecting a characteristic portion of an image, comprising locking an image in a desired image state while monitoring a state of input of the image to be transmitted and using a center portion of the locked image as the characteristic portion of the image.

6. A data transmission method as set forth in claim 2, wherein when detecting a characteristic portion of an image, comprising displaying a state of input of the image to be transmitted, specifying a certain location on the display screen, and using the portion around the specified point as the characteristic portion of the image.

7. A data transmission method as set forth in claim 3, wherein when detecting a characteristic portion of an image, comprising displaying a state of input of the image to be transmitted, specifying a certain location on the display screen, and using the portion around the specified point as the characteristic portion of the image.

8. A data transmission method as set forth in claim 4, wherein when locking a target image by using a characteristic portion of an image, comprising fetching and tracking the image at a frame rate the same as or higher than the image to be transmitted and refreshing a reference image serving as a reference for tracking at a rate the same as or higher than the transmission frame rate.

9. A data transmission method as set forth in claim 5, wherein when locking a target image by using a characteristic portion of an image, comprising fetching and tracking the image at a frame rate the same as or higher than the image to be transmitted and refreshing a reference image serving as a reference for tracking at a rate the same as or higher than the transmission frame rate.

10. A data transmission method as set forth in claim 1, comprising displaying a state of input of the image to be transmitted and specifying a range to be transmitted on the display to determine the range of transmission of the image.

11. A data transmission method for transmitting at least image data, comprising the steps of:
    capturing an image including a target image to be transmitted;
    making adjustments so that the target image to be transmitted from the captured image has a preset size; and
    compressing and transmitting the adjusted image data in the image frame.

12. A data transmission method as set forth in claim 11, wherein when making adjustments so that a target image has a preset size, comprising using an image of a characteristic portion of the image to be transmitted for matching and cutting out the image around the part of the best match for tracking of the image.

13. A data transmission method as set forth in claim 11, wherein when making adjustments so that a target image has a preset size, comprising using an image of a characteristic portion of the image to be transmitted to calculate a distance in the characteristic portion and using this for enlargement, reduction, and tracking of the image.

14. A data transmission method as set forth in claim 12, wherein when detecting a characteristic portion of an image, comprising locking an image in a desired image state while monitoring a state of input of the image to be transmitted and using a center portion of the locked image as the characteristic portion of the image.

15. A data transmission method as set forth in claim 13, wherein when detecting a characteristic portion of an image, comprising locking an image in a desired image state while monitoring a state of input of the image to be transmitted and using a center portion of the locked image as the characteristic portion of the image.

16. A data transmission method as set forth in claim 12, wherein when detecting a characteristic portion of an image, comprising displaying a state of input of the image to be transmitted, specifying a certain location on the display screen, and using the portion around the specified point as the characteristic portion of the image.

17. A data transmission method as set forth in claim 13, wherein when detecting a characteristic portion of an image, comprising displaying a state of input of the image to be transmitted, specifying a certain location on the display screen, and using the portion around the specified point as the characteristic portion of the image.

18. A data transmission method as set forth in claim 14, wherein when locking a target image by using a characteristic portion of an image, comprising fetching and tracking the image at a frame rate the same as or higher than the image to be transmitted and refreshing a reference image serving as a reference for tracking at a rate the same as or higher than the transmission frame rate.

19. A data transmission method as set forth in claim 15, wherein when locking a target image by using a characteristic portion of an image, comprising fetching and tracking the image at a frame rate the same as or higher than the image to be transmitted and refreshing a reference image serving as a reference for tracking at a rate the same as or higher than the transmission frame rate.

20. A data transmission method as set forth in claim 11, comprising displaying a state of input of a transmitted image and specifying a range to be transmitted on the display to determine the range of transmission of the image.

21. A data transmission method for displaying at least image data of a user on a display screen among a plurality of terminals and transmitting at least image data while displaying received image data on the display screen, comprising
capturing an image including a target image of a user to be transmitted from substantially the center of the display screen.

22. A data transmission method for displaying at least image data of a user on a display screen among a plurality of terminals and transmitting at least image data while displaying received image data of another party on the display screen and displaying content for common discussion on the display screen, comprising the steps of:
Capturing an image including a target image of a user to be transmitted from substantially a center of the display screen and
displaying the image data at one of an upper portion or a lower portion of the display screen from the substantially center portion of the display screen serving as the capturing portion and displaying the content at the other portion.

23. A data transmission method as set forth in claim 22, comprising displaying image data above the content on the display screen.

24. A data transmission method as set forth in claim 22, comprising displaying image data below the content on the display screen.

25. A data transmission apparatus for transmitting at least image data accommodated in an image frame of a preset size, comprising
an imaging means for capturing an image including a target image to be transmitted;
a first circuit for making adjustments so that the target image to be transmitted from the captured image by the imaging means substantially fully fills the image frame; and
a second circuit for compressing and transmitting the adjusted image data in the image frame.

26. A data transmission apparatus as set forth in claim 25, wherein when making adjustments so that the target image to be transmitted fully fills the image frame, said first circuit uses an image of a characteristic portion of the image to be transmitted for matching and cuts out the image around the part with the best match for tracking of the image.

27. A data transmission apparatus as set forth in claim 25, wherein when making adjustments so that the target image to be transmitted frilly fills the image frame, said first circuit uses an image of a characteristic portion of the image to be transmitted to calculate a distance in the characteristic portion and uses this for enlargement, reduction, and tracking of the image.

28. A data transmission apparatus as set forth in claim 26, comprising a displaying means for displaying image data and a locking means able to lock an image displayed by the displaying means in a desired image state, wherein when detecting a characteristic portion of an image, said first circuit uses the center portion of the image locked by the locking image as the characteristic portion of the image.

29. A data transmission apparatus as set forth in claim 27, comprising a displaying means for displaying image data and a locking means able to lock an image displayed by the displaying means in a desired state, wherein when detecting a characteristic portion of an image, said first circuit uses the center portion of the image locked by the lacking image as the characteristic portion of the image.

30. A data transmission apparatus as set forth in claim 26, comprising
a displaying means for displaying image data and including a pointer able to specify a certain location and a specifying means able to specify a certain location of the image displayed on the displaying means by the pointer, wherein when detecting a characteristic portion of an image, said first circuit uses a portion around the point specified by the specifying means as the characteristic portion of the image.

31. A data transmission apparatus as set forth in claim 27, comprising a displaying means for displaying image data and including a pointer able to specify a certain location and a specifying means able to specify a certain location of the image displayed on the displaying means by the pointer, wherein when detecting a characteristic portion of an image, said first circuit uses a portion around the point specified by the specifying means as the characteristic portion of the image.

32. A data transmission apparatus as set forth in claim 28, wherein when locking a target image by using a characteristic portion of the image, said first circuit fetches the image and performs a tracking operation at a frame rate the same as or higher than the image to be transmitted and refreshes a reference image serving as a reference for tracking at a rate the same as or higher than the transmission frame rate.

33. A data transmission apparatus as set forth in claim 29, wherein when locking a target image by using a characteristic portion of the image, said first circuit fetches the image and performs a tracking operation at a frame rate the same as or higher than the image to be transmitted and refreshes a reference image serving as a reference for tracking at a rate the same as or higher than the transmission frame rate.

34. A data transmission apparatus as set forth in claim 25, comprising a displaying means for displaying image data and including a pointer able to specify a certain location and a specifying means able to specify a certain location of the image displayed by the displaying means by the pointer, wherein said first circuit decides on the range specified by the specifying means as the range for transmission of the image.

35. A data transmission apparatus for transmitting at least image data, comprising
an imaging means for capturing an image including a target image to be transmitted;
a first circuit for making adjustments so that the target image to be transmitted from the captured image has a preset size; and
a second circuit for compressing and transmitting the adjusted image data in the image frame.

36. A data transmission apparatus as set forth in claim 35, wherein when making adjustments so that the target image has a preset size, said first circuit uses an image of a characteristic portion of the image to be transmitted for matching and cuts out the image around the part with the best match for tracking of the image.

37. A data transmission apparatus as set forth in claim 35, wherein when making adjustments so that the target image has a preset size, said first circuit uses an image of a characteristic portion of the image to be transmitted to calculate a distance in the characteristic portion and uses this for enlargement, reduction, and tracking of the image.

38. A data transmission apparatus as set forth in claim 36, comprising a displaying means for displaying image data and a locking means able to lock an image displayed by the displaying means in a desired state, wherein when detecting a characteristic portion of an image, said first circuit uses a center portion of the image locked by the locking image as the characteristic portion of the image.

39. A data transmission apparatus as set forth in claim 37, comprising a displaying means for displaying image data and a locking means able to lock an image displayed by the displaying means in a desired state, wherein when detecting a characteristic portion of an image, said first circuit uses a center portion of the image locked by the locking image as the characteristic portion of the image.

40. A data transmission apparatus as set forth in claim 36, comprising a displaying means for displaying image data and including a pointer able to specify a certain location and a specifying means able to specify a certain location of the image displayed on the displaying means by the pointer, wherein when detecting a characteristic portion of an image, said first circuit uses a portion around the point specified by the specifying means as the characteristic portion of the image.

41. A data transmission apparatus as set forth in claim 37, comprising a displaying means for displaying image data and including a pointer able to specify a certain location and a specifying means able to specify a certain location of the image displayed on the displaying means by the pointer, wherein when detecting a characteristic portion of an image, said first circuit uses a portion around the point specified by the specifying means as the characteristic portion of the image.

42. A data transmission apparatus as set forth in claim 38, wherein when locking a target image by using a characteristic portion of the image, said first circuit fetches the image and performs a tracking operation at a frame rate the same as or higher than the image to be transmitted and refreshes a reference image serving as a reference for tracking at a rate the same as or higher than the transmission frame rate.

43. A data transmission apparatus as set forth in claim 39, wherein when locking a target image by using a characteristic portion of the image, said first circuit fetches the image and performs a tracking operation at a frame rate the same as or higher than the image to be transmitted and refreshes a reference image serving as a reference for tracking at a rate the same as or higher than the transmission frame rate.

44. A data transmission apparatus as set forth in claim 35, comprising a displaying means for displaying image data and including a pointer able to specify a certain location and a specifying means able to specify a certain location of the image displayed by the displaying means 5 by the pointer, wherein said first circuit decides on the range specified by the specifying means as the range for transmission of the image.

45. A data transmission system for displaying at least image data of a user on a display screen among a plurality of terminals and transmitting at least image data while displaying received image data of another party on the display screen, wherein a terminal comprises an imaging means for capturing an image including a target image to be transmitted;

a first circuit for making adjustments so that the target image to be transmitted from the captured image by the imaging means substantially fully fills an image frame; and a second circuit for compressing and transmitting the adjusted image data in the image frame.

46. A data transmission system for displaying at least image data of a user on a display screen among a plurality of terminals and transmitting at least image data while displaying received image data of another party on the display screen, wherein a terminal comprises an imaging means for capturing an image including a target image to be transmitted;

a first circuit for making adjustments so that the target image to be transmitted from the captured image becomes a preset size; and a second circuit for compressing and transmitting the adjusted image data in an image frame.

47. A data transmission system for displaying at least image data of a user on a display screen among a plurality of terminals and for transmitting at least image data while displaying received image data on the display screen, wherein an imaging means for capturing an image including a target image to be transmitted is provided substantially at the center of the display screen.

48. A data transmission system for displaying at least image data of a user on a display screen among a plurality of terminals and for transmitting at least image data while displaying received image data of another party on the display screen and displaying content for common discussion on the display screen comprising an imaging means provided substantially at the center of the display screen and capturing an image including a target image to be transmitted and a displaying means for displaying the image data at one of an upper portion or a lower portion of the display screen from the substantially center portion of the display screen serving as the capturing portion and displaying the content at the other portion.

* * * * *